(12) United States Patent
Kijima et al.

(10) Patent No.: US 6,259,500 B1
(45) Date of Patent: Jul. 10, 2001

(54) LIQUID CRYSTAL DISPLAY DEVICE

(75) Inventors: Ryuichi Kijima; Shogo Fujioka; Masumi Kubo; Yozo Narutaki, all of Nara-ken (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/418,325

(22) Filed: Oct. 14, 1999

(30) Foreign Application Priority Data

Oct. 14, 1998 (JP) .................................................. 10-292657
Aug. 9, 1999 (JP) .................................................. 11-255761

(51) Int. Cl.$^7$ ................................................ G02F 1/1336
(52) U.S. Cl. ............................ 349/113; 349/155; 349/138
(58) Field of Search .................................... 349/138, 113, 349/155, 141

(56) References Cited

U.S. PATENT DOCUMENTS 5,610,741 * 3/1997 Kimura ................................ 349/113

FOREIGN PATENT DOCUMENTS 5-323371 12/1993 (JP) .
11-101992 4/1999 (JP) .

* cited by examiner

Primary Examiner—James A. Dudek
(74) Attorney, Agent, or Firm—Nixon & Vanderhye, P.C.

(57) ABSTRACT

A liquid crystal display device of the present invention includes: a first substrate; a second substrate; a liquid crystal layer interposed between the first substrate and the second substrate; a display region including a plurality of pixel regions each defined by a pair of electrodes for applying a voltage across the liquid crystal layer; and a non-display region surrounding the display region. The first substrate includes a reflection electrode region provided in the display region for each of the pixel electrodes. The reflection electrode region includes a first insulating layer having a surface which exhibits a concave/convex profile and a reflection layer formed on the first insulating layer. The first substrate includes a second insulating layer in the non-display region. $H_{min} - 0.5 \leq h_{mode} \leq H_{max} + 0.5$ (unit: $\mu$m) where: $h_{mode}$ denotes a mode among heights of the insulating layer surface in the non-display region with respect to a reference surface; and $H_{max}$ and $H_{min}$ respectively denote maximum and minimum heights of a surface of the reflection layer in the display region which exhibits the concave/convex profile with respect to the reference surface.

12 Claims, 19 Drawing Sheets

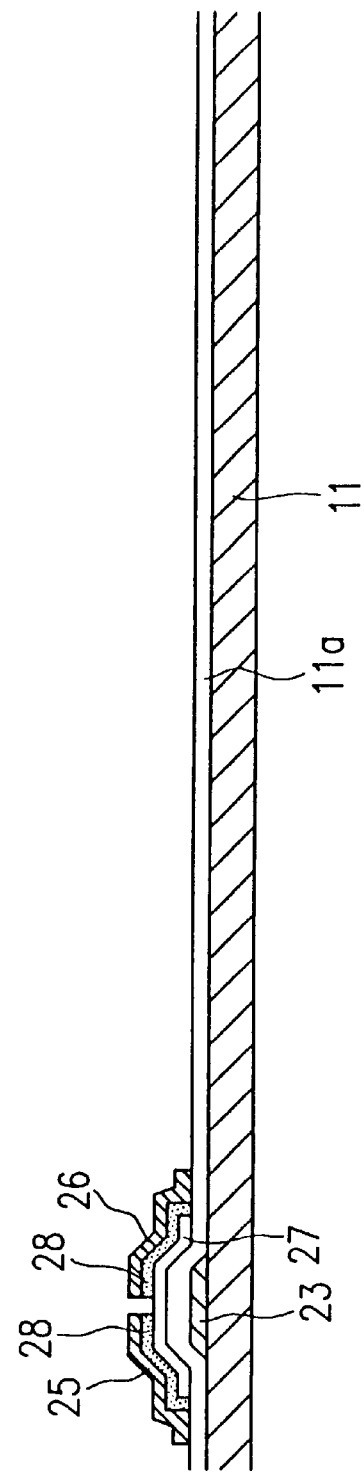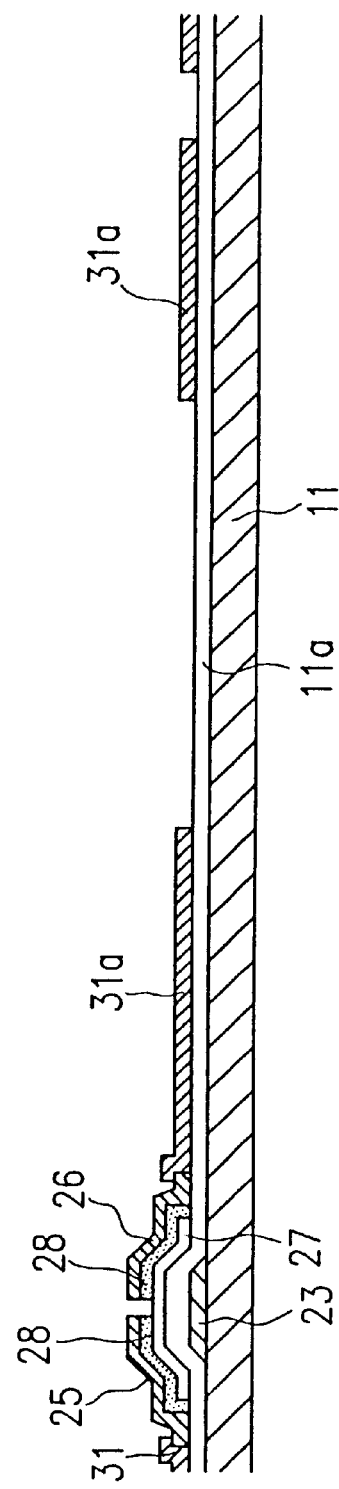

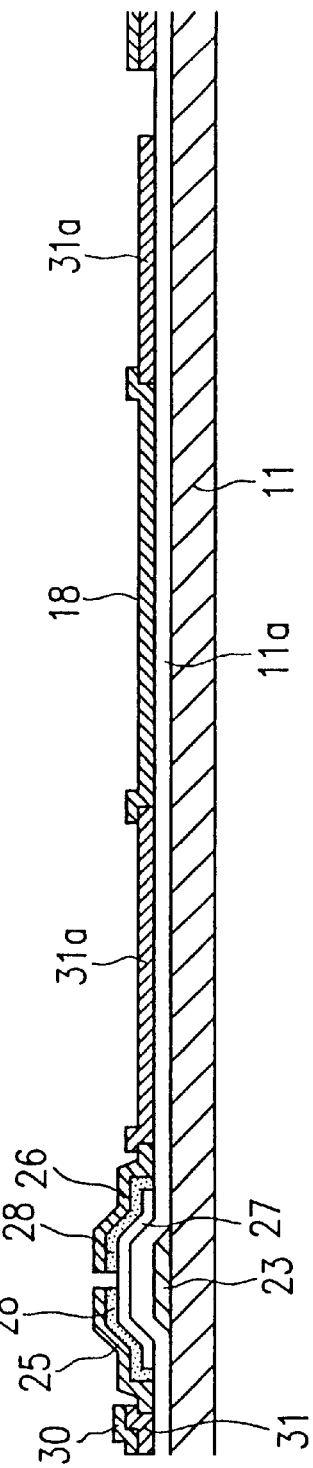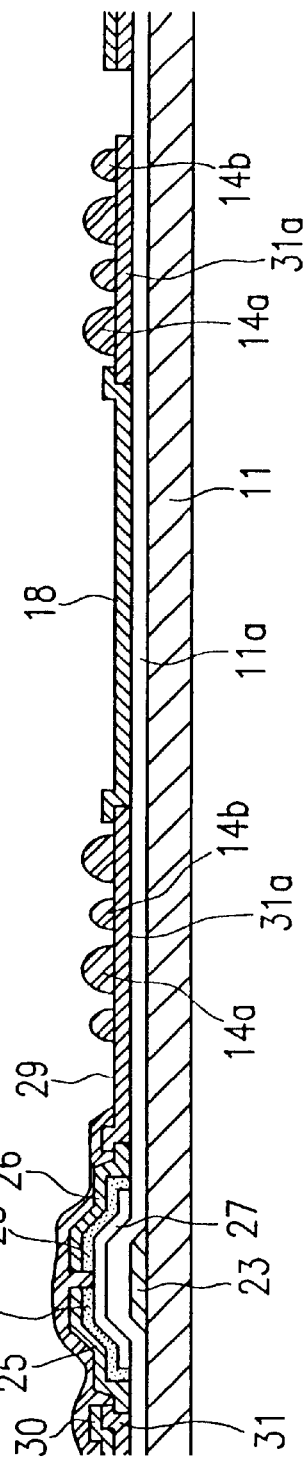
FIG. 4A
FIG. 4B

Diameter of spacer = Size of concave portion

Diameter of spacer < Size of concave portion

PRIOR ART

LIQUID CRYSTAL DISPLAY DEVICE

BACKGROUND OF THE INVENTION

1. Field of the Invention

The present invention relates to a reflection type LCD (liquid crystal display) device and a transmission/reflection type LCD device for use in an OA (office automation) apparatus (such as a word processor or a personal computer), a portable information apparatus (such as an electronic organizer), a camera and VTR unit which includes a liquid crystal monitor, and the like.

2. Description of the Related Art

Unlike a CRT (cathode ray tube) or EL (electroluminescence) display device, an LC (liquid crystal) panel does not itself emit light. A transmission type LCD device includes a back light (a device including a fluorescent lamp) provided on the back of the LC panel so that a display can be produced by controlling the LC panel to selectively transmit and block light from the back light.

In a transmission type LCD device, however, the power consumed by the back light typically accounts for 50% or more of the total power consumption. Therefore, the power consumption of the LCD device substantially increases by the provision of a back light.

A reflection type LCD device is preferably used in a portable information apparatus which is carried around by the user and often used outdoors. A reflection type LCD device includes a reflector, instead of a back light, so that a display can be produced by controlling the LC panel to selectively transmit and block ambient light which is reflected by the reflector.

For example, Japanese Laid-Open Publication No. 5-323371 discloses a reflection type LCD device in which an interlayer insulating layer is provided over a plurality of gate lines, a plurality of source lines perpendicularly crossing the gate lines, and switching elements each connected to one of the gate lines and one of the source lines, so that a pixel region can be extended over the lines to improve the aperture ratio. A reflection electrode region of a pixel electrode formed on the interlayer insulating layer overlaps the gate lines and the source lines via the interlayer insulating film therebetween. Moreover, concave/convex portions of a few $\mu$m height/depth are provided on the surface of the interlayer insulating layer, thereby providing a reflection electrode region whose surface exhibits a concave/convex profile. In such an LCD device having such a structure, ambient light of various incident angles can be used as display light, thereby producing a desirable display with little viewing angle dependency.

However, in the conventional LCD device as disclosed in Japanese Laid-Open Publication No. 5-323371, the gap between the pair of substrates of the LCD device (so called a "cell gap") cannot be accurately controlled, thereby deteriorating the display quality.

In the conventional LCD device, particulate spacers are provided between the pair of substrates (e.g., an active matrix substrate and a counter substrate) interposing an LC layer therebetween so as to control the cell gap. More specifically, particulate spacers (e.g., spherical spacers made of a plastic resin) are uniformly dispersed on at least one of the substrates, after which the substrates are pressed onto each other via the particulate spacers so as to be attached to each other with a sealant therebetween, thus controlling the gap between the pair of substrates. The size of the spacers, which dictates the cell gap, can be determined based on the liquid crystal display mode to be employed. A spherical spacer (or a cylindrical spacer) having a diameter of about 2–6 $\mu$m is typically used to provide a cell gap with which an optimal optical path length is obtained. With the method as described above in which particulate spacers are dispersed, it is difficult to place the spacers at desired positions on the substrate, whereby a uniform cell gap may not be obtained in a case where there are concave/convex portions (steps) provided on the surface of the substrate.

An exemplary method for forming such concave/convex portions on the surface of the interlayer insulating layer is as follows. First, a positive type photosensitive resin is applied on a substrate using a spin coater, or the like. Then, the substrate is exposed via a mask and developed. The mask includes holes arranged in a predetermined pattern corresponding to reflection electrode regions. Then, the substrate is subjected to a heat treatment so as to form the concave/convex portions. The present inventors have found that the following problem arises when the interlayer insulating layer having concave/convex portions is provided only for the reflection electrode region, aiming to merely improve the efficiency in using reflected light.

The problem will be described below with reference to FIGS. 17A and 17B. When providing an underlying layer using a positive type photosensitive resin to provide a concave/convex profile to the surface of the interlayer insulating layer, if a portion of the underlying layer corresponding to the non-display region is left unexposed, a defective display may occur along the periphery of the display region adjacent the non-display region (i.e., the portion of the display region hatched in FIG. 17A).

The unexposed portion of the underlying layer (which corresponds to the non-display region) has a larger thickness than the exposed portion (which corresponds to the display region where convex portions are formed) due to the reduction in thickness through an exposure/development process for the positive type resist. Then, if spacers of the same diameter are dispersed in the cell gap, the cell gap may vary between the display region and the non-display region. More particularly, a portion of the display region will have a cell gap larger than a predetermined cell gap. The variation in cell gap may cause the defective display.

Particularly, the present inventors have found that the deterioration in display quality due to the variation in cell gap is more significant in a transmission/reflection type LCD device (as that disclosed in commonly-owned Japanese Laid-Open Publication No. 9-201176) than in a reflection type LCD device. In order to improve the display quality of a transmission/reflection type LCD device, it is preferred to control the optical path length of the reflection region to be as close as possible to that of the transmission region. In particular, the thickness of the LC layer in the reflection region is preferably about ½ of that in the transmission region. If the cell gap is shifted from the optimal value by X $\mu$m, for example, the optical path length of the transmission region will be shifted from the optimal value by X $\mu$m, while that of the reflection region will be shifted from the optimal value by 2× $\mu$m. Thus, display quality deteriorates due to the difference in the influence of the cell gap shift on the display between the transmission region and the reflection region.

The variation in cell gap deteriorates the display quality in any of the various LC display modes, including the TN (twisted nematic) mode, the parallel alignment mode, the vertical alignment mode, etc. Particularly, when a normally white mode is employed as the display mode, a change in cell gap substantially reduces the contrast ratio. In a normally white mode, a black display is produced in the presence of a predetermined applied voltage. Therefore, if there is a variation in cell gap, the voltage required to produce a black display will vary for different positions, thereby deteriorating the quality of a black display. The contrast ratio of an LCD device is more influenced by the black display quality than by the white display quality. Thus, the deterioration in contrast ratio is more significant in a normally white mode than in a normally black mode.

SUMMARY OF THE INVENTION

The following terms are used in this specification. The term "transmission region" as used herein in connection with a transmission/reflection type LCD device refers to a region in which a display is produced by using transmitted light, while the term "reflection region" refers to a region in which a display is produced by using reflected light. The transmission region includes a transmission electrode region and an LC layer interposed between a pair of substrates, while the reflection region includes a reflection electrode region and the LC layer. The transmission electrode region and the reflection electrode region which are provided on the substrate define the transmission region and the reflection region, respectively. Typically, the transmission electrode region is defined by a transparent electrode. The reflection electrode region may be defined by a reflection electrode or by a combination of a transparent electrode and a reflection layer.

According to one aspect of this invention, a liquid crystal display device includes: a first substrate; a second substrate; a liquid crystal layer interposed between the first substrate and the second substrate; a display region including a plurality of pixel regions each defined by a pair of electrodes for applying a voltage across the liquid crystal layer; and a non-display region surrounding the display region. The first substrate includes a reflection electrode region provided in the display region for each of the pixel electrodes. The reflection electrode region includes a first insulating layer having a surface which exhibits a concave/convex profile and a reflection layer formed on the first insulating layer. The first substrate includes a second insulating layer in the non-display region. $H_{min}-0.5 \leq h_{mode} \leq H_{max}+0.5$ (unit: $\mu$m) where; $h_{mode}$ denotes a mode among heights of the insulating layer surface in the non-display region with respect to a reference surface; and $H_{max}$ and $H_{min}$ respectively denote maximum and minimum heights of a surface of the reflection layer in the display region which exhibits the concave/convex profile with respect to the reference surface.

In one embodiment of the invention, $H_{min}-0.5 \leq h \leq H_{max}+0.5$ (unit: $\mu$m) where h denotes a height of a surface of the second insulating layer in the non-display region with respect to the reference surface.

In one embodiment of the invention, the second insulating layer in the non-display region includes a surface which exhibits a concave/convex profile, the concave/convex profile being substantially the same as that of the first insulating layer in the display region.

In one embodiment of the invention, the second insulating layer in the non-display region includes a surface which exhibits a concave/convex profile, the concave/convex profile being different from that of the first insulating layer in the display region.

According to another aspect of this invention, a liquid crystal display device includes: a first substrate; a second substrate; a liquid crystal layer interposed between the first substrate and the second substrate; a display region including a plurality of pixel regions each defined by a pair of electrodes for applying a voltage across the liquid crystal layer; and a non-display region surrounding the display region. The first substrate includes a reflection electrode region provided in the display region for each of the pixel electrodes. The reflection electrode region includes a first insulating layer having a surface which exhibits a concave/convex profile and a reflection layer formed on the first insulating layer. The first substrate includes a second insulating layer in the non-display region. An interval between the first substrate and the second substrate is controlled to be uniform by spacers of substantially the same diameter which are provided on a portion of the first insulating layer in the display region which is not covered with the reflection layer and on the second insulating layer in the non-display region.

In one embodiment of the invention, a distribution of heights of the first insulating layer with respect to a reference surface in the display region is substantially the same as that in the non-display region.

In one embodiment of the invention, the pair of electrodes comprises a pixel electrode and a counter electrode. The first substrate includes: a plurality of gate lines; a plurality of source lines perpendicularly crossing the gate lines; a plurality of switching elements each of which is provided in a vicinity of an intersection of one of the gate lines and one of the source lines; and a plurality of the pixel electrodes connected to the switching elements, respectively. The second substrate includes a plurality of the counter electrodes. Each of the pixel regions is defined by one of the pixel electrodes, one of the counter electrodes, a portion of the liquid crystal layer interposed between the one of the pixel electrodes and the one of the counter electrodes. The first substrate further includes a transmission electrode region which is provided for each of the pixel regions.

In one embodiment of the invention, the first substrate further includes a transmission region which is provided for each of the pixel regions. A thickness of the liquid crystal layer in the reflection electrode region is about ½ of that in the transmission electrode region.

In one embodiment of the invention, a seal section is provided in the non-display region for attaching the first substrate to the second substrate and for sealing the liquid crystal layer within a gap between the first substrate and the second substrate. No insulating layer is provided in a region of the first substrate in the non-display region corresponding to the seal section.

A function of the present invention will be described below.

In a conventional LCD device, an insulating layer having a concave/convex surface may exist in the display region, and the height of the insulating layer surface with respect to a reference surface or the surface of the substrate (hereinafter, referred to also as the "substrate surface") in the non-display region may be significantly different from the height of the reflection layer surface having concave/convex portions in the display region with respect to the substrate surface. In such a case, the interaction between a spacer and a surface supporting the spacer in the display region is substantially different from that in the non-display region, whereby a uniform cell thickness cannot be obtained across the entire panel. In view of this, according to the present invention, the insulating layer in the non-display region may be formed so that the following expression:

$$H_{min}-0.5 \leq h_{mode} \leq H_{max}+0.5 \text{ (unit: } \mu\text{m)}$$

is satisfied. Herein, h mode denotes the mode among heights of the insulating layer surface in the non-display region with respect to the substrate surface (i.e., the height with respect to the substrate surface which accounts for the greatest area of the non-display region) and $H_{max}$ and $H_{min}$ respectively denote the maximum and minimum heights of the concave/convex reflection layer surface in the display region with respect to the substrate surface.

In this way, the display non-uniformity due to the variation in cell thickness can be suppressed to an acceptable level. In the above expression, a margin of −0.5 μm is allowed for Hmin while a margin of +0.5 μm is allowed for $H_{max}$. If the variation in cell thickness exceeds about ±0.5 μm, the optical transmission, the contrast, etc., of the LCD device will not meet the desirable specification. For example, the optical transmission changes by 10% or more for a −0.5 μm change in the cell gap, while the contrast is reduced by half for a +0.5 μm change in the cell gap.

Moreover, in the present invention, the insulating layer in the non-display region may be formed so that the following expression:

$$H_{min}-0.5 \leq h \leq H_{max}+0.5 \text{ (unit: } \mu m)$$

is satisfied. Herein, h denotes the height of the insulating layer surface in the non-display region with respect to the substrate surface.

In this way, it is possible to reduce the difference between the interaction of a spacer with a surface supporting the spacer in the display region and that in the non-display region, and to thus realize a uniform cell thickness across the entire panel.

Furthermore, in the present invention, concave/convex portions may be provided on the insulating layer surface in the non-display region. In this way, it is possible to further reduce the difference between the interaction of a spacer with a surface supporting the spacer in the display region and that in the non-display region, and to thus realize a uniform cell thickness across the entire panel.

Moreover, an interlayer insulating layer whose surface has concave/convex portions arranged in substantially the same pattern as that in the display region may be formed in the non-display region. In this way, the display region and the non-display region have substantially the same surface condition, and thus substantially the same influence on the cell spacers, whereby it is possible to maintain a uniform cell thickness. The variation in the surface profile due to the variation in the conditions under which the interlayer insulating layer is produced has substantially the same influence on the display region and on the non-display region. Therefore, even if the production conditions vary, the cell gap can be suppressed or prevented from being varied. If the reflection layer in the display region has a thickness large enough to influence the cell gap, the surface profile of the display region, including the thickness of the reflection layer, can be controlled to be substantially the same as that of the non-display region.

In the present invention, the interlayer insulating layer may be provided in the display region as well as in the non-display region so as to control the cell thickness to be uniform using spacers of the same diameter. The uniformity of the cell gap can be further increased if the display region and the non-display region have substantially the same distribution in height (or thickness) of the interlayer insulating layer surface, which is the spacer supporting surface, with respect to the substrate surface (the glass surface) or with respect to any other predefined plane. If the display region and the non-display region have substantially the same mode among the distributed thicknesses of the interlayer insulating layer with respect to the substrate surface (i.e., the same thickness with respect to the substrate surface which accounts for the greatest area), the cell gap can be controlled to be uniform. Of course, the uniformity in cell gap may be further improved if the overall thickness distribution in the display region is the same as that in the non-display region.

The improvement in display quality provided by increasing the cell gap uniformity is particularly significant in a transmission/reflection type LCD device. In particular, a transmission/reflection type LCD device having a desirable display quality can be provided by adjusting the thickness of the interlayer insulating layer so that the thickness of the LC layer in the reflection region is about ½ of that in the transmission region, thereby matching the optical path length of the reflection region with that of the transmission region.

Moreover, by providing no interlayer insulating layer in the seal region, the adhesion between the sealant and the respective substrates is improved while improving the reliability of the seal section.

Thus, the invention described herein makes possible the advantage of providing a reflection type or transmission/reflection type LCD device having a high display quality without a defective display due to a variation in cell gap.

This and other advantages of the present invention will become apparent to those skilled in the art upon reading and understanding the following detailed description with reference to the accompanying figures.

BRIEF DESCRIPTION OF THE DRAWINGS

FIGS. 3A–5B are cross-sectional views illustrating a method for producing an active matrix substrate of a transmission/reflection type LCD device;

Figure 15A:
Figure 15B:
Figure 16A:
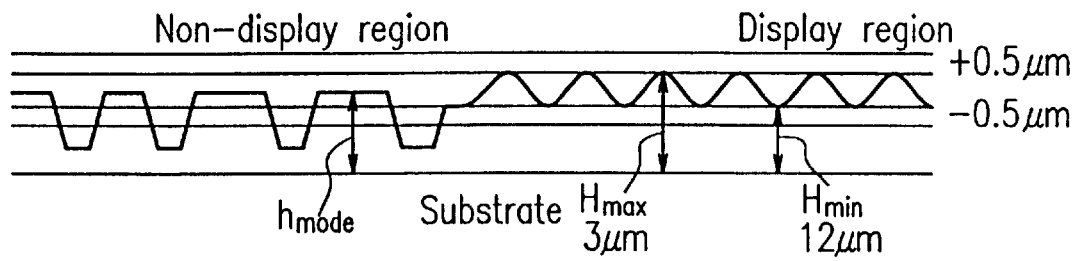
Figures 1, 16B:
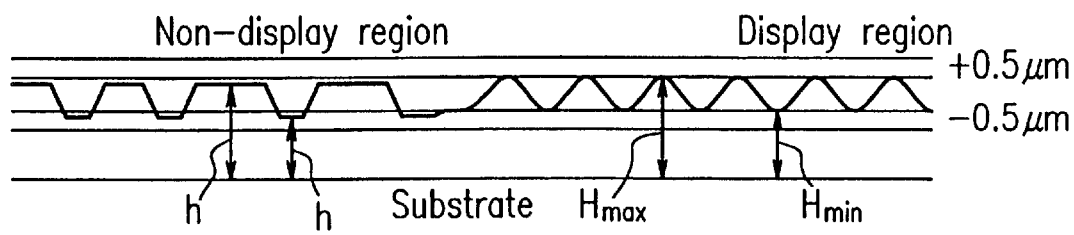
Figures 2, 16B:
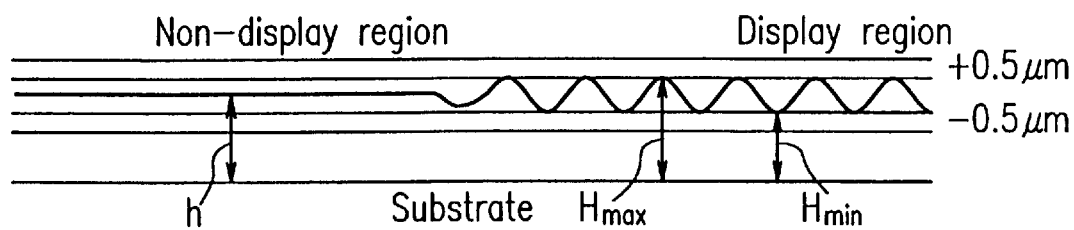
Figure 16C:
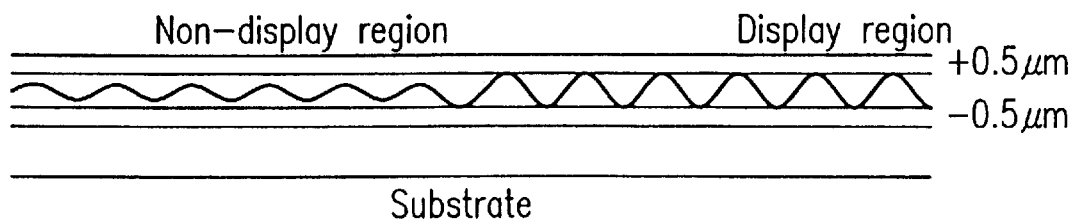
Figure 17A:
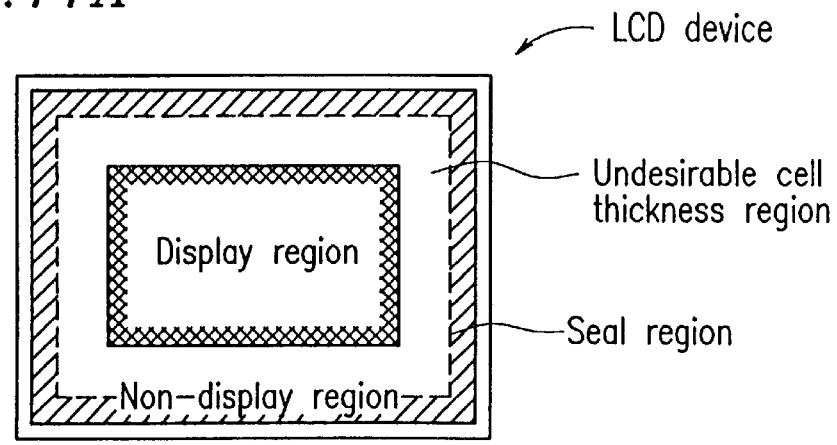
Figure 17B:
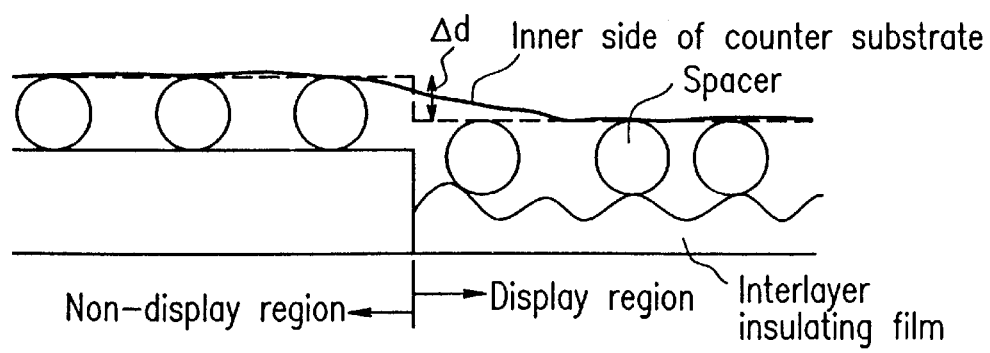

Each of FIGS. 15A and 15B is a cross-sectional view illustrating an alternative spacer diameter with respect to the size of a concave portion;

Each of FIGS. 16A to 16C is a view illustrating alternative cross sections of a non-display region and a display region; and FIGS. 17A and 17B are a top view and a cross-sectional view, respectively, illustrating a defective display which may occur in a conventional LCD device due to a variation in cell gap.

DESCRIPTION OF THE PREFERRED EMBODIMENTS

An embodiment of the present invention will be described below with reference to the accompanying drawings. First, a transmission/reflection type LCD device with which the present invention can be preferably used and a method for producing the same will be described.

Figure 1A:
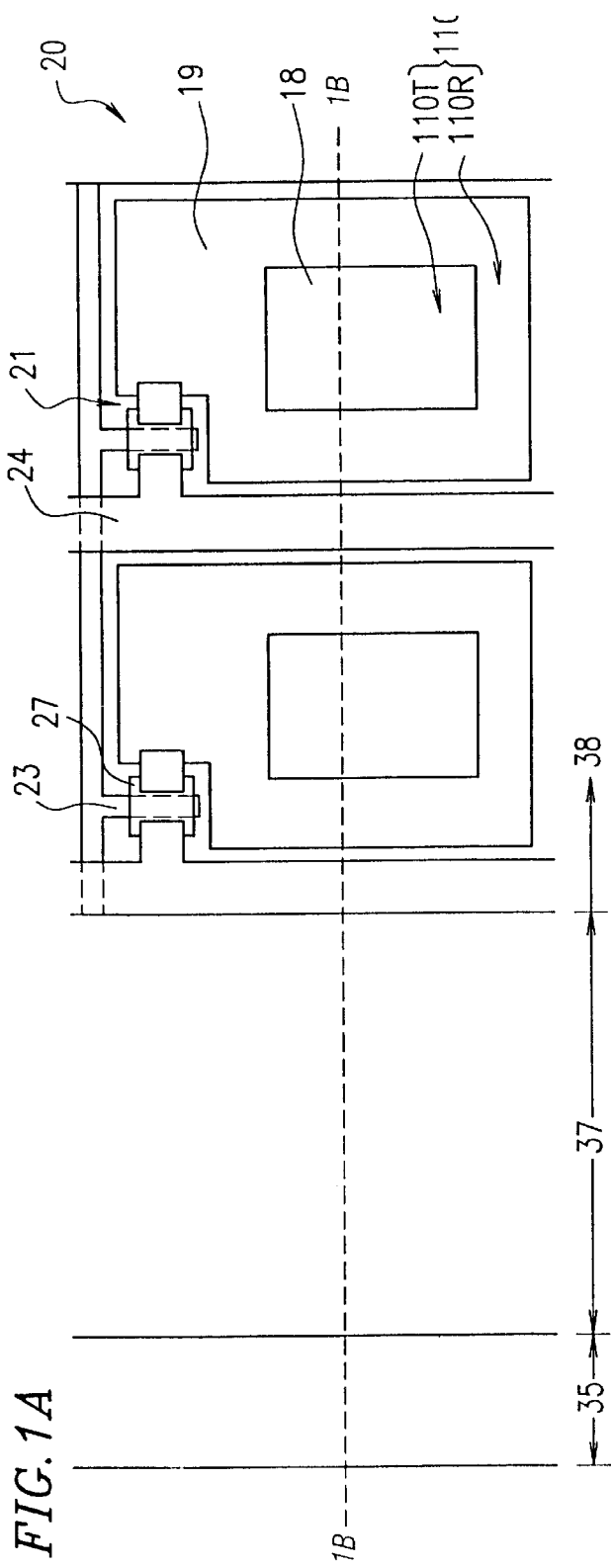
FIG. 1A is a top view schematically illustrating a portion of a transmission/reflection type LCD device of the present invention.
Figure 1B:
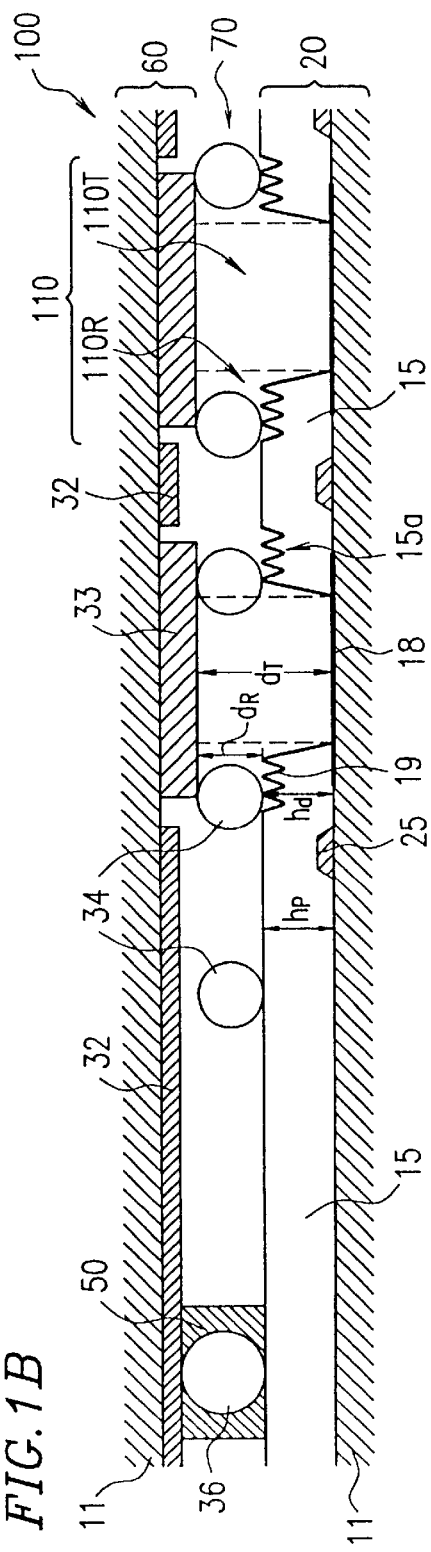
FIG. 1B is a cross-sectional view taken along line 1B—1B FIG. 1A.

FIGS. 1A and 1B schematically illustrate a transmission/reflection type LCD device 100 according to the present invention, wherein FIG. 1A is a top view and FIG. 1B is a cross-sectional view taken along line 1B—1B in FIG. 1A.

The LCD device 100 is a transmission/reflection type LCD device and includes a reflection region 110R and a transmission region 110T within a pixel region 110. The reflection region 110R and the transmission region 110T are respectively defined by a reflection electrode region 19 and a transmission electrode region 18 provided on an active matrix substrate 20. In the illustrated example, the reflection electrode region 19 and the transmission electrode region 18 are respectively formed by a reflection electrode and a transmission electrode. The transmission electrode region 18 and the reflection electrode region 19 are both connected to a thin film transistor (TFT) 21 so that they together function as a pixel electrode.

The LCD device 100 has a display region 38 (including a plurality of pixel regions 110 arranged in a matrix), and a non-display region 37 surrounding the display region 38. In a peripheral portion of the non-display region 37, a seal region 35 is defined by a seal section 50 which is provided for attaching the active matrix substrate 20 to a counter substrate (or a color filter substrate) 60 and for sealing an LC layer 70 within a gap between the substrates 20 and 60. A "display region" as used herein refers to a region where a pixel is present, while a "non-display region" as used herein refers to a region other than the display region except as otherwise described herein. The non-display region includes a portion where the insulating layer is provided and another portion where the insulating layer is not provided. The portion of the non-display region where the insulating layer is provided is designated herein as the "non-display region 37". The insulating layer may or may not be provided in the seal region which is included in the non-display region 37.

The reflection electrode region 19 is provided on an interlayer insulating layer 15. A surface 15a of a portion of the interlayer insulating layer 15 on which the reflection electrode region 19 is provided exhibits a concave/convex profile. In this way, the reflection surface of the reflection electrode region 19 exhibits a concave/convex profile, thereby realizing a reflection characteristic with which it is possible to produce a white display with little occurrence of interference colors. The thickness of the interlayer insulating layer 15 can be adjusted so that the thickness $d_R$ of the LC layer 70 in the reflection region 110R is about ½ of the thickness $d_T$ thereof in the transmission region 110T. The interlayer insulating layer 15 is provided not only in the reflection region 110R in the display region 38 but also in the non-display region 37.

The pair of substrates 20 and 60 firmly adhere to each other by a sealing material to which seal spacers 36 are added, while the cell gap therebetween is kept constant by cell spacers 34. Typically, the size of the seal spacers 36 is selected to be a few μm larger than that of the cell spacers 34 taking into consideration the thickness of a color filter layer 33 of the counter substrate which does not exist in the seal region 35. The size of the seal spacers 36 may be optimized so that a glass substrate 11 is not warped in a portion of the non-display region 37 near the seal region 35.

The cell gap which is defined by the cell spacers 34 is influenced by the height $h_d$ of the surface of the reflection electrode 19 in the display region 38 (the spacer supporting surface) with respect to the substrate surface (or the height of the surface of a portion of the interlayer insulating layer 15 which is not covered with the reflection electrode) and by the height $h_p$ of the surface of the interlayer insulating layer 15 in the non-display region 37 with respect to the substrate surface. According to the present invention, $h_d$ and $h_p$ are substantially equal to each other, thereby preventing a defective display from occurring due to the variation in cell gap.

The heights $h_d$ and $h_p$ being substantially equal to each other means that there will be no variation in cell gap, which may otherwise cause a defective display along the boundary between the display region 38 and the non-display region 37, even when the cell gap is controlled by the spacers of the same diameter in the display region 38 and in the non-display region 37. This is a condition regarding the height (the height range and/or the height distribution) of the surface of the interlayer insulating layer 15 with respect to the substrate surface, which is required for uniformly controlling the gap between the pair of substrates 20 and 60 across the display region 38 and the non-display region 37 by using the spacers 34 of the same diameter provided on the reflection electrode 19 (or the interlayer insulating layer 15) in the display region 38 and on the interlayer insulating layer 15 in the non-display region 37. This condition and a method for realizing the same will later be described in greater detail in Examples 1–3.

Now, a basic structure of a transmission/reflection type LCD device, which is an embodiment for which the effect of the present invention is particularly significant, and a method for producing the same will be described below.

Figure 2:
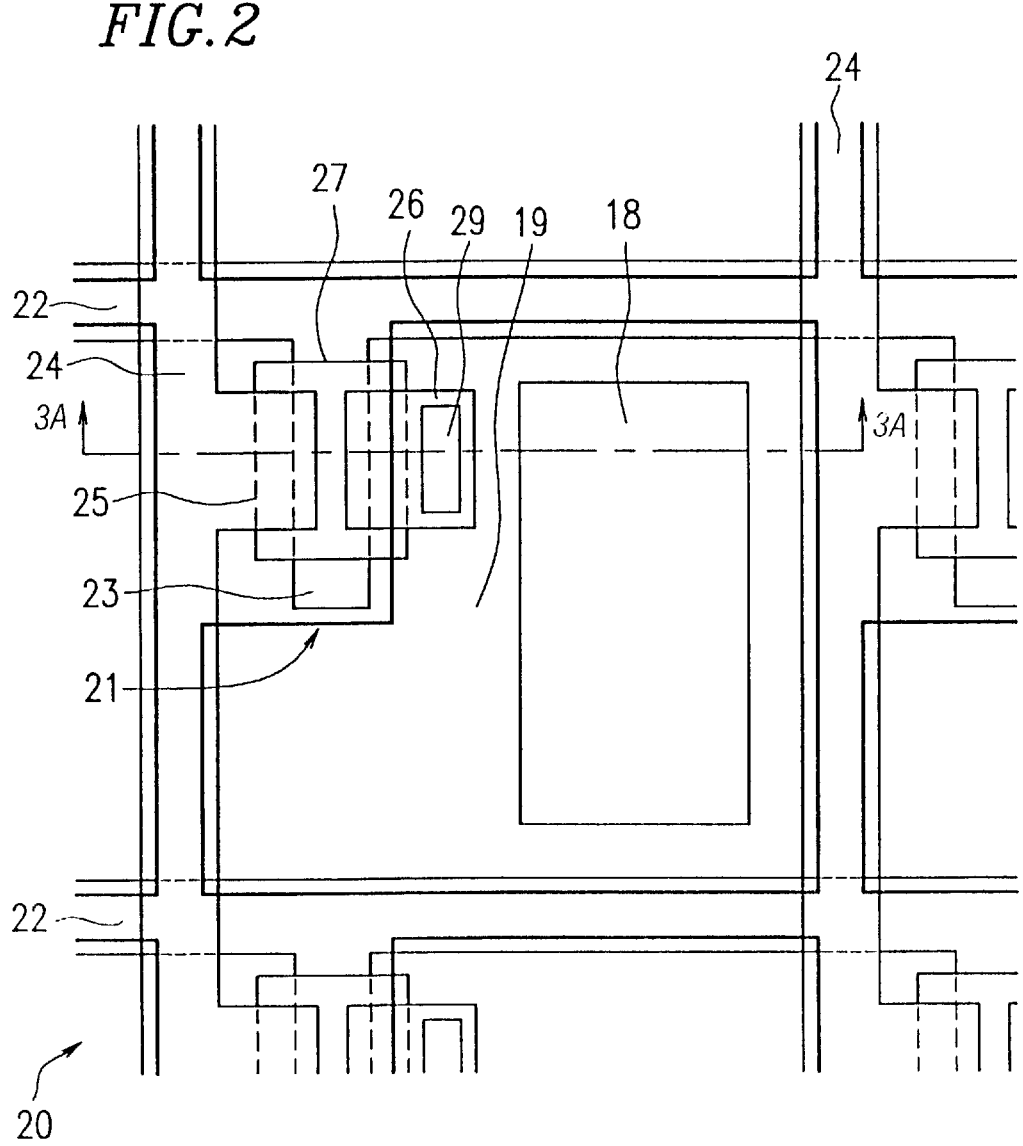
FIG. 2 is a top view illustrating an active matrix substrate of a transmission/reflection type LCD device.

FIG. 2 is a plan view illustrating the active matrix substrate 20 for use in a transmission/reflection type LCD device, and FIGS. 3A–5B are cross-sectional views taken along line 3A–3A in FIG. 2 illustrating a process of producing the active matrix substrate 20.

Figure 5A:
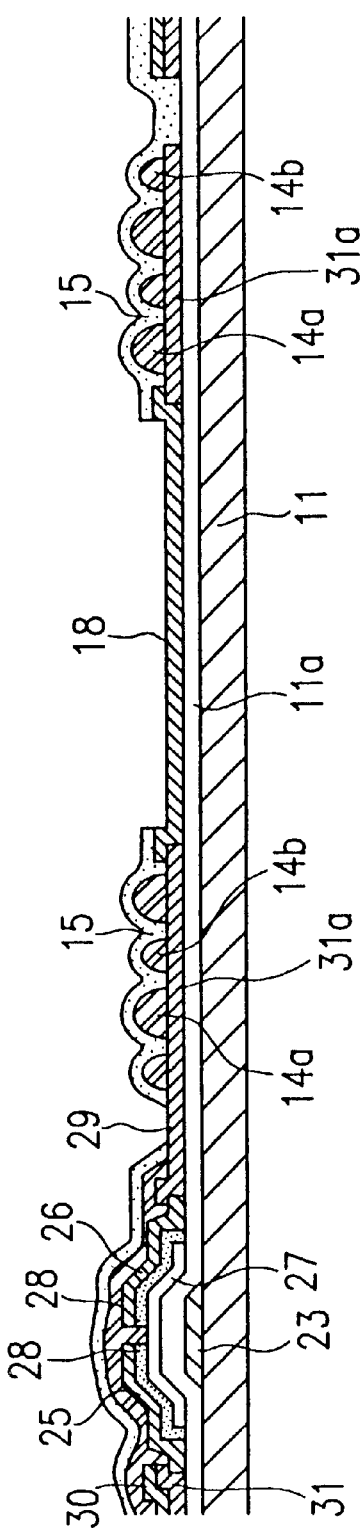
Figure 5B:
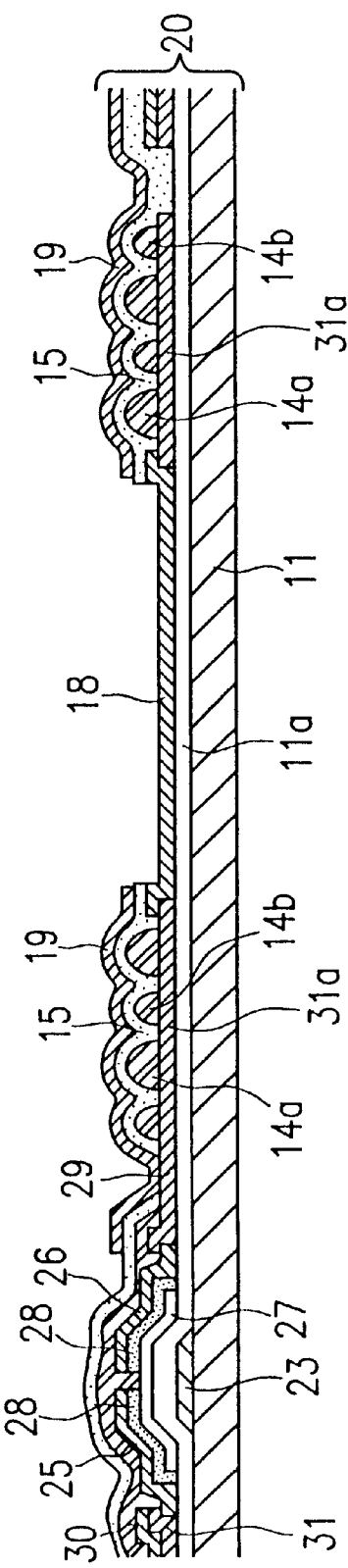

As illustrated in FIGS. 2 and 5B, the active matrix substrate 20 for use in a transmission/reflection type LCD device includes the insulating glass substrate 11, a plurality of gate bus lines 22 as scanning lines, and a plurality of source bus lines 24 as signal lines crossing the gate bus lines 22. Each rectangular region which is surrounded by a pair of adjacent gate bus lines 22 and a pair of adjacent source bus lines 24 includes the reflection electrode 19 which is made of a material having a high optical reflection efficiency and the transparent electrode 18 which is made of a material having a high optical transmission efficiency. The reflection electrode 19 and the transparent electrode 18 together form a pixel electrode.

Near a corner of each pixel electrode region, a gate electrode 23 diverges from the gate bus lines 22 and extends toward the pixel electrode. In the middle of the gate electrode 23, the thin film transistor (TFT) 21 is provided as a switching element. The gate electrode 23 constitutes a part of the TFT 21.

The other elements of the TFT 21 are provided above the gate electrode 23 which is provided on the glass substrate 11 as illustrated in FIG. 5B. The gate electrode 23 is covered with a gate insulating film 11a, on which a semiconductor layer 27 is provided to extend over the gate electrode 23. A pair of contact layers 28 and 28 are provided to cover the ends of the semiconductor layer 27, respectively.

The source bus line 24 electrically contacts a source electrode 25 which is provided on the contact layer 28. An end of the source electrode 25 overlaps the gate electrode 23 while being insulated therefrom, thereby constituting another part of the TFT 21. A drain electrode 26 of the TFT 21 is provided on the contact layer 28 over the gate electrode 23. The drain electrode 26 is spaced apart from the source electrode 25 and overlaps the gate electrode 23 while being insulated therefrom. The drain electrode 26 electrically contacts the pixel electrode via an underlying electrode 31a.

The underlying electrode 31a is provided so as to overlap the gate bus line 22 for the next pixel via the gate insulating film 11a, thereby forming a storage capacitor. The underlying electrode 31a may substantially extend over the entire region where concave/convex portions (which will be described later with reference to FIG. 8B) exist, whereby the influence of the process is made uniform.

Below the reflection electrode 19 which is made of a material having a high optical reflection efficiency as described above, relatively tall convex portions 14a and relatively short convex portions 14b are randomly arranged over the glass substrate 11. A polymeric resin film (interlayer insulating film) 15 is provided over the convex portions 14a and 14b.

The convex portions 14a and 14b are formed by patterning a photosensitive polymer using photolithography and then rounding off the upper corner of the patterned polymer by a heat treatment. The upper surface of the polymeric resin film 15 exhibits a continuous wavy profile due to the presence of the convex portions 14a and 14b. The polymeric resin film 15 is provided not only below the reflection electrode 19 but substantially over the entire area of the glass substrate 11. For example, "OFPR-800" (Tokyo Ohka Kogyo Co., Ltd.) may be used as a material of the polymeric resin film 15 in the present embodiment.

The reflection electrode 19 is provided on the portion of the polymeric resin film 15 having a continuous wavy profile over the convex portions 14a and 14b. The reflection electrode 19 is formed of a material having a high optical reflection efficiency, e.g., Al. The reflection electrode 19 is electrically connected to the drain electrode 26 via a contact hole 29.

In the transmission/reflection type LCD device of the present invention, the transparent electrode 18 is provided separately from the reflection electrode 19. The transparent electrode 18 is formed of a material having a high optical transmission efficiency, e.g., ITO (indium tin oxide).

Next, a method for forming the reflection electrode 19 and the transparent electrode 18 of the active matrix substrate 20 for use in a transmission/reflection type LCD device will be described with reference to FIGS. 3A–5B.

The gate bus lines 22 (see FIG. 2) made of Cr, Ta, or the like, and the gate electrodes 23 respectively diverging from the gate bus lines 22 are formed on the glass substrate 11, as illustrated in FIG. 3A.

The gate insulating film 11a made of SiNx, SiOx, or the like, is formed across the entire surface of the glass substrate 11 so as to cover the gate bus lines 22 and the gate electrodes 23. The semiconductor layer 27 made of amorphous silicon (a-Si), polycrystalline silicon, CdSe, or the like, is formed on a portion of the gate insulating film 11a over the gate electrode 23. The contact layers 28 and 28 made of amorphous silicon (a-Si) are formed to cover the ends of the semiconductor layer 27, respectively.

The source electrode 25 made of Ti, Mo, Al, or the like, is formed to overlap one of the contact layers 28 and 28. The drain electrode 26 made of Ti, Mo, Al, or the like, as the source electrode 25, is formed to overlap the other one of the contact layers 28 and 28.

In the present embodiment, a glass substrate (e.g., "7059": Corning Inc.) having a thickness of about 1.1 mm may be used for the glass substrate 11.

Next, as illustrated in FIG. 3B, a metal layer 31 to be a lower layer of the source bus lines 24 (see FIG. 2) is formed by sputtering. Then, the metal layer 31 is patterned so as to simultaneously form the source bus lines 24 and the underlying electrode 31a.

Next, as illustrated in FIG. 4A, an ITO layer 30 to be an upper layer of the source bus lines 24 (see FIG. 2) is sputtered and patterned.

In the present embodiment, the source bus lines 24 have a two-layer structure including the metal layer 31 and the ITO layer 30. This structure is advantageous in that it is possible to prevent disconnection of the source bus line 24 even when a defect occurs in a portion of the metal layer 31 of the source bus line 24 because the electrical connection of the source bus line 24 will still be ensured by the ITO layer 30.

The ITO layer 30 is patterned to form the upper layer of the source bus lines 24 while forming the transparent electrode 18 of the pixel electrode. In this way, the transparent electrode 18 can be simultaneously produced with the formation of the source bus lines 24, thereby reducing the number of layers to be provided and the number of film formation steps required.

Next, as illustrated in FIG. 4B, the convex portions 14a and 14b are formed from a resist film 12 (see FIGS. 6A and 6B) which is made of a photosensitive resin in an area where the reflection electrode 19 is to be formed by a patterning process. The corners of the convex portions 14a and 14b are rounded off. Each of the convex portions 14a and 14b has a substantially circular horizontal cross section. Preferably, the convex portions 14a and 14b are not formed on the transparent electrode 18, so that a voltage can be applied more efficiently across the LC layer. However, substantially no optical effect will be provided by forming the convex portions 14a and 14b on the transparent electrode 18.

Now, a process of forming the convex portions 14a and 14b in the reflection electrode region will be described with reference to FIGS. 6A–6D.

Figure 6A:
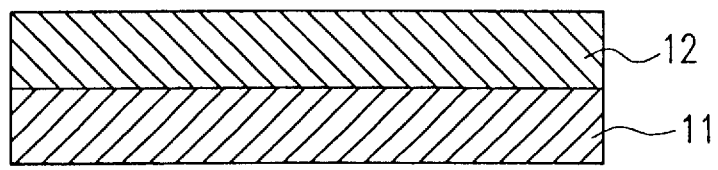
FIGS. 6A–6D are cross-sectional views illustrating a method for producing an underlying layer in a reflection region on which an interlayer insulating layer whose surface exhibits a concave/convex profile.

First, as illustrated in FIG. 6A, the resist film 12 of a photosensitive resin is formed by a spin coat method on the glass substrate 11 (note that the metal layer 31 and the underlying electrode 31a are actually formed on the glass substrate 11 as illustrated in FIG. 4B, though they are not shown in FIGS. 6A–6D for the simplicity). More specifically, the resist film 12 may be formed by spin coating the photosensitive resin "OFPR-800" (the same material as that of the polymeric resin film 15 which will be described later) preferably at about 500 rpm to about 3000 rpm (at about 1500 rpm and for about 30 seconds in the present embodiment) so as to be about 2.5 μm in thickness.

Next, the glass substrate 11 having the resist film 12 formed thereon is pre-baked at about 90° C. for about 30 minutes, for example.

Figure 6B:
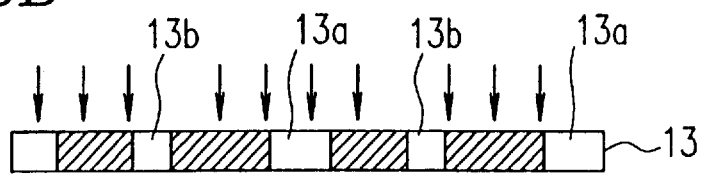
Figure 7:
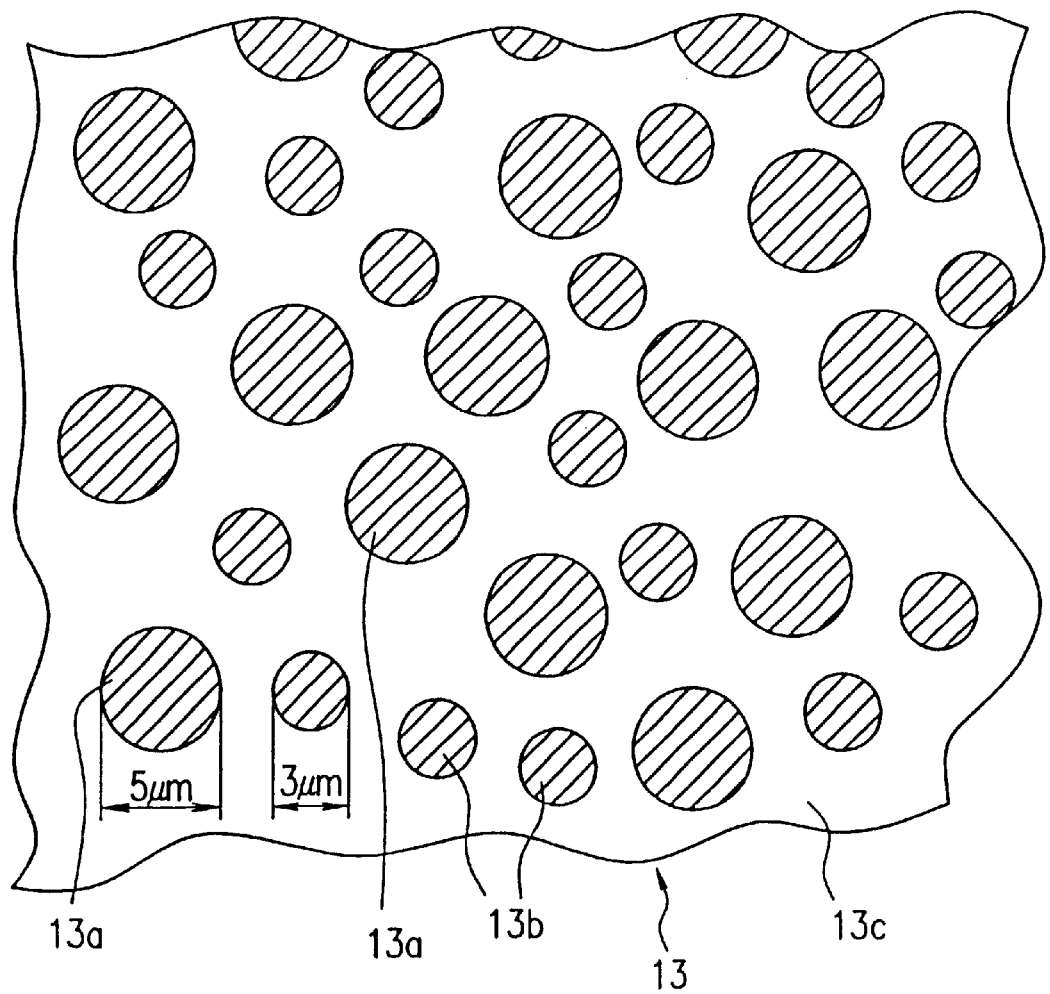
FIG. 7 illustrates an exemplary photomask for use in the production method illustrated in FIGS. 6A–6D.

Then, a photomask 13 including a plate body 13c having two types of circular pattern holes 13a and 13b therein, as illustrated in FIG. 7, is placed over the resist film 12 as illustrated in FIG. 6B, and the resist film 12 is exposed via the photomask 13 as represented by the arrows in FIG. 6B.

More specifically, the photomask 13 employed in the present embodiment includes the circular pattern holes 13a each having a diameter of about 5 μm and the circular pattern holes 13b each having a diameter of about 3 μm. The pattern holes 13a and 13b are randomly arranged, and each pair of adjacent pattern holes are spaced apart from each other by an interval of at least about 2 μm. When the interval is excessively large, the surface of the polymeric resin film 15 covering the convex portions 14a and 14b is not likely to have a continuous wavy profile.

Figure 6C:
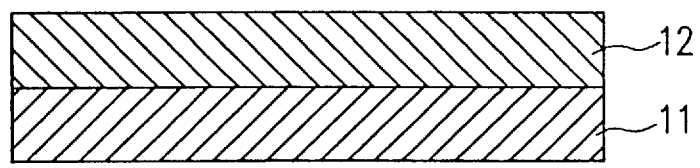

Next, a development process is performed using a developing solution "NMD-3" (Tokyo Ohka Kogyo Co., Ltd.), for example, having a concentration of about 2.38%. Thus, a number of minute protrusions 14a' and 14b' of different heights, respectively, are formed in the reflection electrode region on one side of the glass substrate 11, as illustrated in FIG. 6C. The protrusions 14a' and 14b' have an angular upper corner. In the present embodiment of the present invention, the protrusion 14a' having a height of about 2.48 μm is formed by the pattern hole 13a having a diameter of about 5 μm, and the protrusion 14b' having a height of about 1.64 μm is formed by the pattern hole 13b having a diameter of about 3 μm.

The respective heights of the protrusions 14a' and 14b' may be changed by adjusting the sizes of the pattern holes 13a and 13b, the exposure time, and the development time. The sizes of the pattern holes 13a and 13b are not limited to those specified above. Moreover, pattern holes of a single diameter may alternatively be used.

Figure 6D:
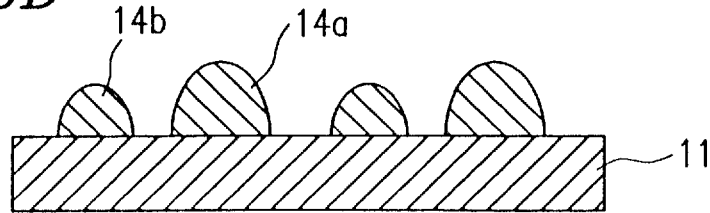

Then, the glass substrate 11 having the protrusions 14a' and 14b' formed thereon is subjected to a heat treatment at about 200° C. for about one hour. Thus, the as-developed protrusions 14a' and 14b' which have an angular upper corner as illustrated in FIG. 6C are softened (melted), thereby rounding off the respective corners of the protrusions 14a' and 14b', as illustrated in FIG. 6D. Each of the convex portions 14a and 14b has a substantially circular horizontal cross section.

The convex portions 14a and 14b as illustrated in FIG. 4B are formed by the process as described above.

Next, the polymeric resin film 15 is formed on the glass substrate 11 by spin coating and patterning a polymeric resin, as illustrated in FIG. 5A. The polymeric resin may be "OFPR-800" and it is spin coated preferably at about 1000 rpm to about 3000 rpm (at about 2000 rpm in the present embodiment).

In this way, the polymeric resin film 15 formed whereby a portion thereof exhibits a continuous wavy profile, as illustrated in FIG. 5A, even though a portion of the underlying electrode 31a exhibits a flat profile where no convex portions 14a and 14b are formed.

Next, the reflection electrode 19 of Al is formed on a predetermined portion of the polymeric resin film 15, as illustrated in FIG. 5B, using a sputtering method, for example. A suitable material for the reflection electrode region 19 may be Al or an Al alloy as well as Ta, Ni, Cr, Ag, or the like, having a high optical reflection efficiency. The thickness of the reflection electrode 19 is preferably about 0.01 μm to about 1.0 μm.

A polarizing plate (not shown) is attached onto the back of the active matrix substrate 20 of the present embodiment which is produced as described above, and a back light is further provided via the polarizing plate.

If an Al film is formed after removing the polymeric resin film 15 from the transparent electrode 18, an electric corrosion may occur. However, the electric corrosion may be prevented by leaving the polymeric resin film 15 on the transparent electrode 18 when forming the Al film.

A portion of the polymeric resin film 15 on a terminal electrode which is used for the connection of a driver provided along the periphery of the active matrix substrate 20 may be removed during the step of removing the polymeric resin film 15 on the transparent electrode 18 by using an ashing process. In this way, it is possible to increase the efficiency of the process and to more efficiently apply a voltage across the LC layer.

In an alternative process of forming concave/convex portions where the polymeric resin film 15 is not used, a layer of Mo, or the like, may be formed between the transparent electrode 18 of ITO and the reflection electrode 19 of Al so as to prevent the electric corrosion.

The reflection electrode 19 of a material having a high optical reflection efficiency produced as described above also has an upper surface which exhibits a continuous wavy profile because the underlying polymeric resin film 15 has a continuous wavy surface as described above.

It is possible to produce a bright paper white display by optimizing the number of concave/convex portions in the display region. However, when the number of the concave/convex portions in the display region is excessively small, it may not be possible to realize a scattering characteristic which allows for such a paper white display as there will be excessive regular reflection by flat portions. On the other hand, when the number of the concave/convex portions in the display region is excessively large, it will be difficult to achieve a desirable random arrangement of the concave/convex portions, thereby resulting in interference of reflection light. Under the current production conditions, the convex portions are formed at a density of about 15000 convex portions/mm$^2$ for a reflection type LCD device and about 5300 convex portions/mm$^2$ for a transmission/reflection type LCD device. For the nondisplay region, as the density of the convex portions to be formed decreases, the area to be exposed increases, thereby shifting the average thickness of the interlayer insulating layer toward the minimum thickness thereof. On the other hand, as the density of the concave portions to be formed decreases, the area to be exposed decreases, thereby shifting the average thickness of the interlayer insulating layer toward the maximum thickness thereof. Thus, it is preferred to approximate the number of concave/convex portions to be produced in the nondisplay region to that in the display region to further reduce the difference between the interaction of a spacer with a surface supporting the spacer in the display region and that in the non-display region.

In the present embodiment, the transparent electrode 18 is formed simultaneously with the source bus lines 24. Where the source bus lines 24 have a single-layer structure of the metal layer 31 (rather than, for example, the two-layer structure of the metal layer 31 and the ITO layer 30 discussed above), the transparent electrode 18 may be formed separately from the formation of the source bus lines 24.

The active matrix substrate 20 produced by the method as described above is attached to the counter substrate 60 (FIG. 1B) which may be produced by any method known in the art, thereby producing the LCD device 100 as shown in FIG. 1B. The counter substrate 60 has a counter electrode (not shown) formed on the glass substrate 11 substantially over the entire display region, and also has a black matrix 32 for blocking light passing through the gap between adjacent pixel regions and through the non-display region. As necessary, the counter substrate 60 may further include the color filter layer 33. The counter electrode (not shown) may be formed on either the LC layer 70 side or the counter substrate 60 side of the color filter layer 33. On the LC layer 70 side of the substrates 20 and 60, an alignment film (not shown) is provided, as necessary, which is subjected to an alignment treatment.

The pair of substrates 20 and 60 firmly adhere to each other by a sealing material to which the seal spacers 36 are added, while the cell gap therebetween is kept constant by the cell spacers 34 which are dispersed on at least one of the substrates 20 and 60. The seal section 50 of a sealant includes at least one opening or "injection port" (not shown) for injecting an LC material therethrough. After injecting the LC material, the injection port is sealed with a curable resin.

Typically, the size of the seal spacers 36 is selected to be a few μm larger than that of the cell spacers 34 taking into consideration the thickness of the color filter layer 33 which does not exist in the seal region 35. The size of the seal spacers 36 may be optimized so that the glass substrate 11 is not warped in a portion of the non-display region 37 near the seal region 35. In order to effectively prevent the warp of the glass substrate by such an optimization, the height $h_p$ of the surface of the interlayer insulating layer 15 in the non-display region 37 (including the seal region 35) with respect to the substrate surface has a particular relationship with the height $h_d$ of the surface of the reflection electrode 19 in the display region 38 (the spacer supporting surface) with respect to the substrate surface (or the height of the surface of a portion of the interlayer insulating layer 15 which is not covered with the reflection electrode).

For example, in the present embodiment, the cell spacer 34 may be "Micropearl" series (Sekisui Fine Chemical Co., Ltd.), which is a spherical spacer, and the seal spacers 36 may be a glass fiber manufactured by Nippon Electric Glass Co., Ltd., which is a cylindrical spacer.

More specifically, an alignment film (not shown) is applied and rubbed to be about 100 nm in thickness on each of the active matrix substrate 20 and the counter substrate 60. About 100 cell spacers 34/mm² are uniformly dispersed on at least one of the substrates. A thermosetting epoxy seal resin material, to which about 1 wt % to 10 wt % of the seal spacers 36 are added, is applied on at least one of the substrates by using a dispenser application method or a screen printing method. Then, the substrates 20 and 60 are attached to each other, and subjected to a heat curing process with a press machine under a high pressure. Then, the substrates 20 and 60 are severed along a severance line 41 (FIG. 10), and an LC material is injected by a vacuum injection method, after which the injection port is sealed, thereby obtaining an LC cell.

A specific structure of the interlayer insulating layer for obtaining a uniform cell gap and a method for producing the same will be described below in Examples 1–3 of the present invention.

EXAMPLE 1

Figure 8A:
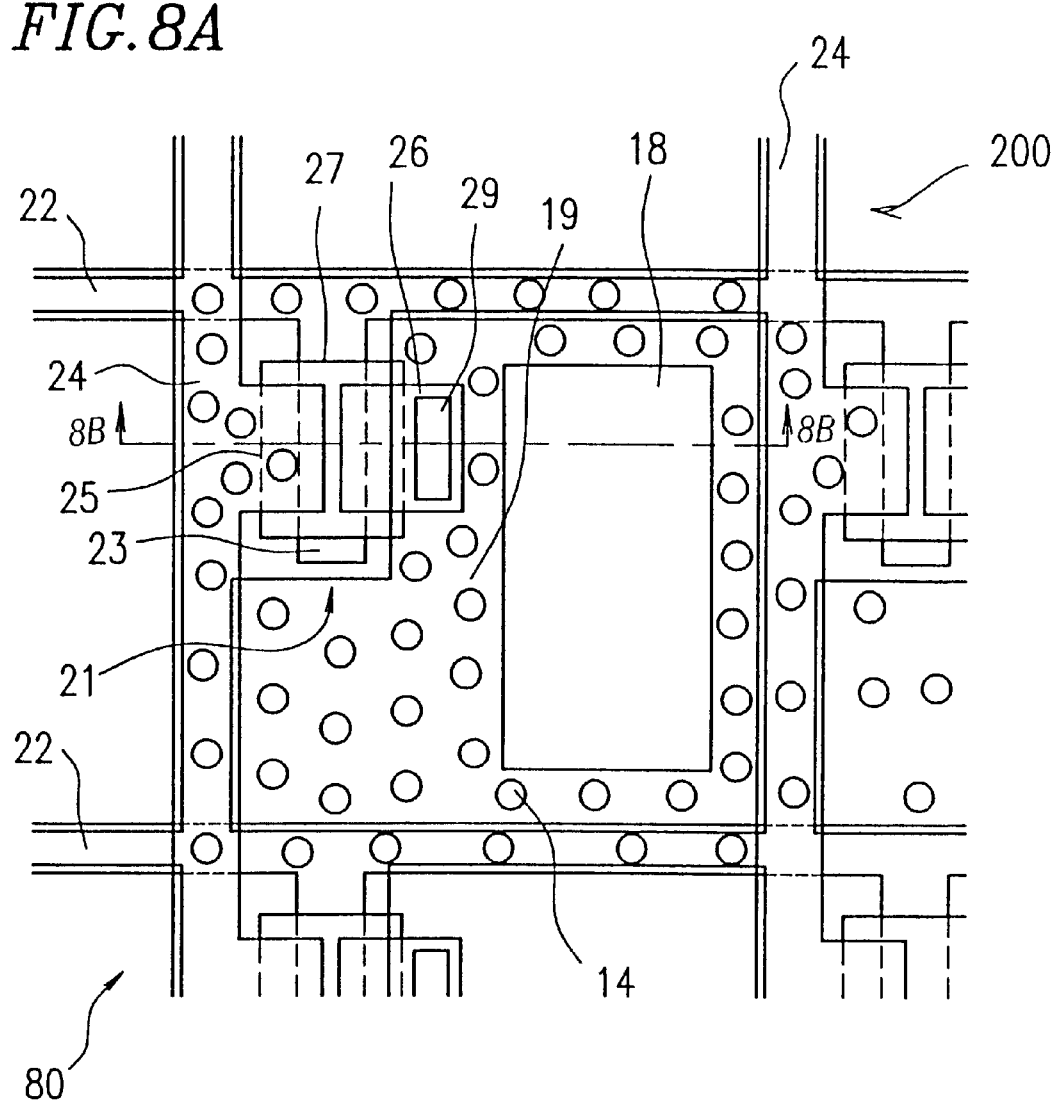
FIG. 8A is a top view schematically illustrating a portion of a transmission/reflection type LCD device according to Example 1 of the present invention.
Figure 8B:
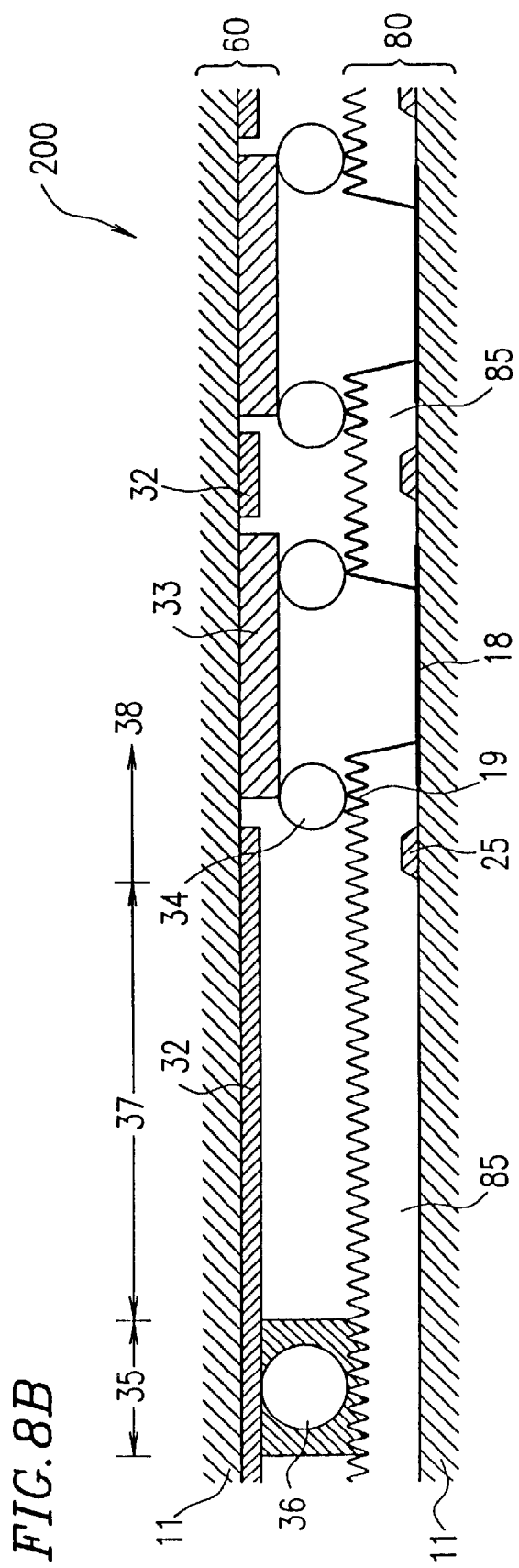
FIG. 8B is a cross-sectional view schematically illustrating a portion of the transmission/reflection type LCD device of Example 1.

A transmission/reflection type LCD device 200 according to Example 1 of the present invention will be described with reference to FIGS. 8A and 8B. FIG. 8A is a top view of a pixel region of an active matrix substrate 80 of the LCD device 200, and FIG. 8B is a cross-sectional view taken along the line 8B—8B of FIG. 8A illustrating a portion of the LCD device 200. The TFT 21 is not shown in FIG. 8B for the sake of simplicity. Elements in these figures having like reference numerals to those already described above will not further be described. In the LCD device 200 of Example 1, the surface of a portion of an interlayer insulating layer 85 over the TFT 21, the gate bus lines 22 and the source bus lines 24 also exhibits a concave/convex profile.

The portion of the interlayer insulating layer 85 over the TFT 21, the gate bus lines 22 and the source bus lines 24 is influenced by any step existing in the underlying layer, whereby such a portion of the interlayer insulating layer 85 has a greater height with respect to the substrate surface than that in the other regions. When the surface of the portion of the interlayer insulating layer 85 over the TFT 21, the gate bus lines 22 and the source bus lines 24 also exhibits a concave/convex profile, the portion of the interlayer insulating layer 85 can be at the same height as that in the other regions, thereby obtaining a uniform cell gap. Moreover, a reflection electrode region whose surface exhibits a concave/convex profile can be formed over the TFT 21, the gate bus lines 22 and the source bus lines 24, whereby ambient light of various incident angles can be more efficiently used as display light.

Although not shown in FIG. 8A, a dummy pixel (not shown), or the like, having substantially the same structure as that of a pixel in the display region 38 but not contributing to a display, may be provided in the non-display region 37 of the active matrix substrate 80 which is shaded by the black matrix 32. Even in regions which do not contribute to a display, bus lines (i.e., the gate lines and the source lines), an active element and/or an interlayer insulating layer may be provided.

In any case, according to the present example, a photomask having the same light blocking pattern as that of the display region 38 is used to provide the convex portions as described above with reference to FIGS. 6A–6D, while providing the interlayer insulating layer 85 whose surface exhibits a concave/convex profile also in the non-display region 37. The effect of steps formed by the lines, or the like, existing under the interlayer insulating layer 85 in the non-display region 37 is not necessarily the same as that in the display region 38.

Figure 9:
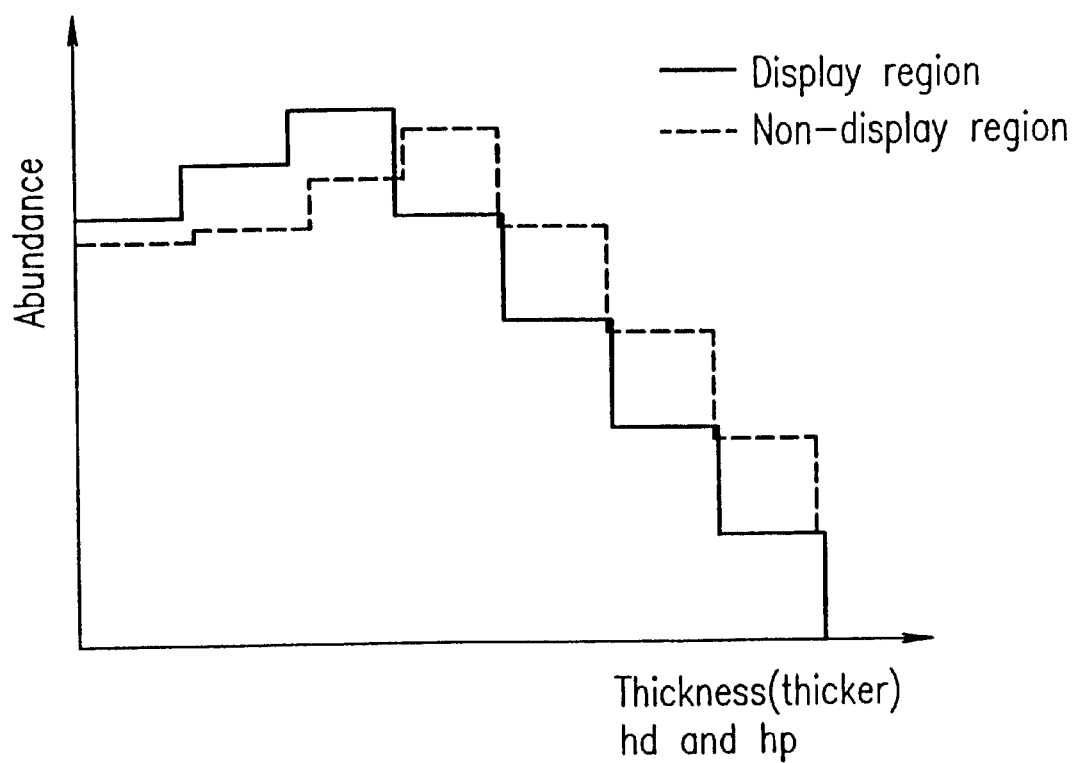
FIG. 9 is a histogram illustrating a thickness distribution of the transmission/reflection type LCD device of Example 1 with respect to the substrate surface.

The interlayer insulating layer 85 was measured by observing a cross section thereof using SEM or by using an interference microscope for its height distribution (thickness distribution) with respect to the substrate surface. The results are shown in FIG. 9. FIG. 9 is a histogram in which the horizontal axis represents the thickness with respect to the substrate surface (i.e., the height of the reflection electrode surface with respect to the substrate surface), for example, in multiples (shown as stepped portions in FIG. 12) of about 0.2 μm in the present embodiment and the vertical axis represents the abundance of the respective thicknesses or heights. As can be seen from FIG. 9, the thickness distribution with respect to the substrate surface differs between the display region 38 and the non-display region 37. However, by providing a concave/convex profile to the surface of the interlayer insulating layer 85 in the non-display region 37 so that the surface profile is the same in the display region 38 and in the non-display region 37, a uniform cell gap can be obtained even when a single size of cell spacers 34 is dispersed across the entire panel of the LCD device 200. Herein, the interlayer insulating layer 85 has substantially the same pattern in the display region 38 and in the non-display region 37 because the thickness of the reflection electrode 19 is set to as small as about 0.3 μm. However, where the thickness of the reflection electrode 19 has some influence on the cell gap, the thickness of the reflection electrode 19 may have to be included in the surface profile of the display region 38 so that the thickness of the non-display region 37 is substantially the same as that of the reflection electrode.

In the present example, the average thickness of the concave/convex portions with respect to the substrate surface (glass surface) (or the average of the thicknesses at the bottom points of the concave portions and those at the tips of the convex portions) is about 2 μm, the diameter of the cell spacer is about 3 μm, and the diameter of the seal spacer is about 5.2 μm.

The present example further provides the following advantages.

The concave/convex profile and the thickness of the interlayer insulating layer 85 substantially depend upon the conditions under which the convex portions (14a and 14b in FIG. 6D) are formed from a photosensitive resin, i.e., the resin application condition, the exposure condition, and particularly the heat treatment condition (the melting condition), and they have a variation of about a few percent among different production lots. Since the concave/convex profile and the thickness of the interlayer insulating film in the display region 38 and those in the non-display region 37 and in the seal region 35 vary in a uniform manner, the optimal relationship between the size of the cell spacers 34 and that of the seal spacers 36 is substantially kept constant even if the production condition somewhat varies. Therefore, even when the size of the cell spacers 34 and that of the seal spacers 36 shift from their respective optimal values due to a variation in the production condition, a variation in cell thickness will not be caused therefrom.

Figure 10:
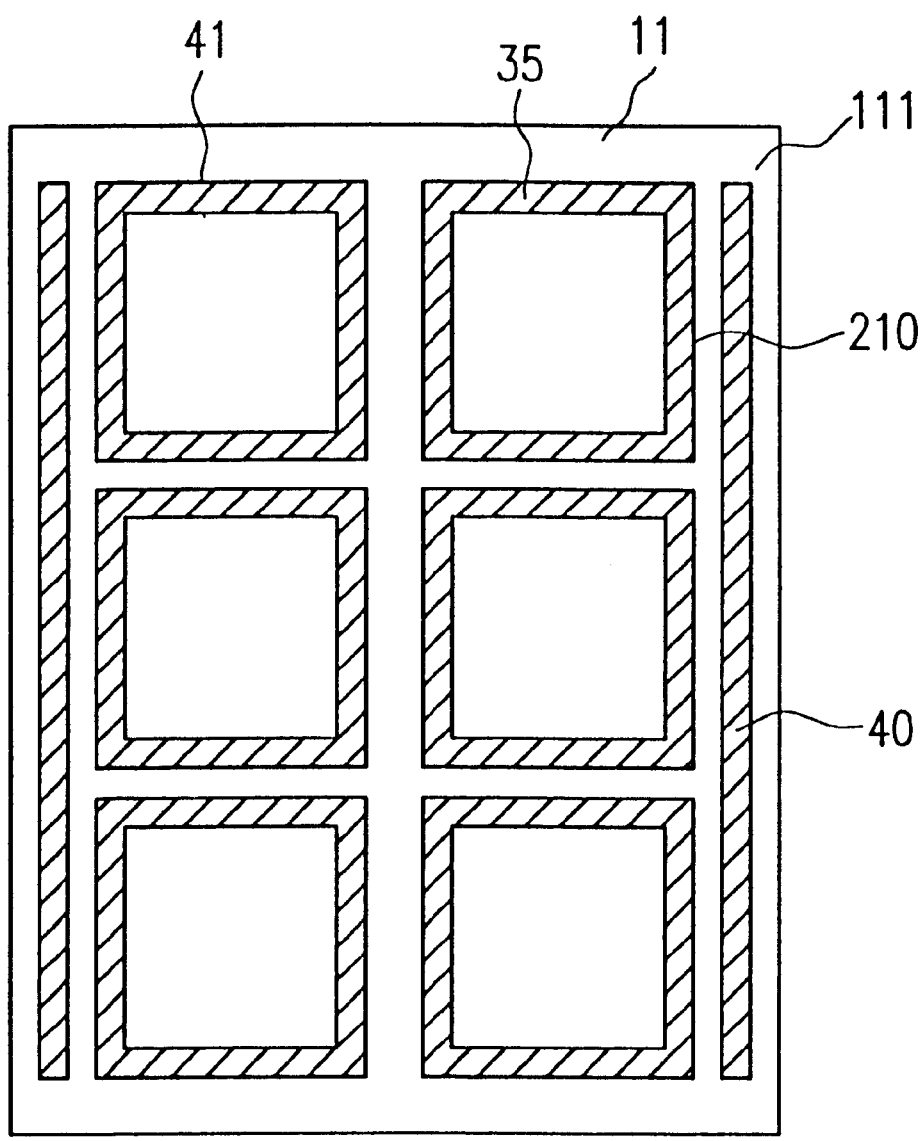
FIG. 10 is a plan view illustrating a mother glass which may be used where a multiple panel method is employed for the production of the transmission/reflection type LCD device of Example 1.

When LC panels 210 are produced from a mother glass substrate 111 by using a multiple panel method (in the specification, the term "multiple panel method" is used to refer to a method by which a plurality of panels are produced from a single substrate), as illustrated in FIG. 10, a dummy seal region 40 may be provided for reinforcement in addition to the seal region 35 which is provided for each LC panel 210. In such a case, an interlayer insulating layer is further provided in the dummy seal region 40, whose surface is also provided with a concave/convex profile as that in the LC panel regions. In such a case, it is possible to suppress or prevent a warp of the mother glass substrate 111 due to a difference between the cell gap in the seal region 35 of the LC panel and that in the dummy seal region 40 even when using the seal spacers 36 of the same size in the seal region 35 and in the dummy seal region 40. Thus, it is possible to further increase the uniformity in the cell gap of an LCD device to be obtained.

Moreover, when concave/convex portions are provided on the portion of the interlayer insulating layer present in the non-display region 37, the cell spacer 34 may fall into a concave portion. In such a case, a cell gap smaller than the spacer diameter can be uniformly realized. Generally, as the diameter of a spacer decreases, the production yield for the spacer substantially decreases, thereby increasing the cost therefor. According to the present invention, it is possible to obtain a uniform cell gap of about 2 μm by using a plastic spacer having a diameter of about 3 μm. While the interval between convex portions (or the size of a concave portion) is shown to be smaller than the spacer diameter for the sake of simplicity, a concave portion may have a size that is substantially equal to the spacer diameter (as illustrated in FIG. 15A) or substantially greater than the spacer diameter (as illustrated in FIG. 15B).

In the present example, the surface of the interlayer insulating layer 85 in the non-display region 37 is provided with a concave/convex profile as that in the display region 38. Alternatively, steps may be provided in the portion of the interlayer insulating layer in the non-display region, as illustrated in FIG. 16A. In such a case, the insulating layer in the non-display region may be formed so that the following expression:

$$H_{min}-0.5 \leq h_{mode} \leq H_{max}+0.5 \text{ (unit: } \mu\text{m)}$$

is satisfied. Herein, hmode denotes the mode among heights of the insulating layer surface in the non-display region with respect to the substrate surface (i.e., the height with respect to the substrate surface which accounts for the greatest area of the non-display region); and $H_{max}$ and $H_{min}$ respectively denote the maximum height (e.g., about 3 μm) and the minimum height (e.g., about 2 μm) of the concave/convex reflection layer surface in the display region with respect to the substrate surface.

In this way, the display non-uniformity due to the variation in cell thickness can be suppressed to an acceptable level.

Moreover, as illustrated in FIGS. 16B-1 and 16B-2, the insulating layer in the non-display region may be formed so that the following expression:

$$H_{min}-0.55 \leq h \leq H_{max}+0.5 \text{ (unit: } \mu\text{m)}$$

is satisfied. Herein, h denotes the height of the insulating layer surface in the non-display region with respect to the substrate surface.

In this way, it is possible to reduce (from that resulting in the case of FIG. 16A) the difference between the interaction of a spacer with a surface supporting the spacer in the display region and that in the non-display region, and to thus realize a uniform cell thickness across the entire panel. In such a case, the surface of the insulating layer in the non-display region may have a concave/convex profile or may alternatively be flat.

Furthermore, the insulating layer surface in the non-display region may be provided with a concave/convex profile which is different from that in the display region, as illustrated in FIG. 16C, whereby it is possible to further reduce (from those resulting in the cases of FIGS. 16A, 16B-1 and 16B-2) the difference between the interaction of a spacer with a surface supporting the spacer in the display region and that in the non-display region, and to thus realize a uniform cell thickness across the entire panel.

EXAMPLE 2

Figure 11A:
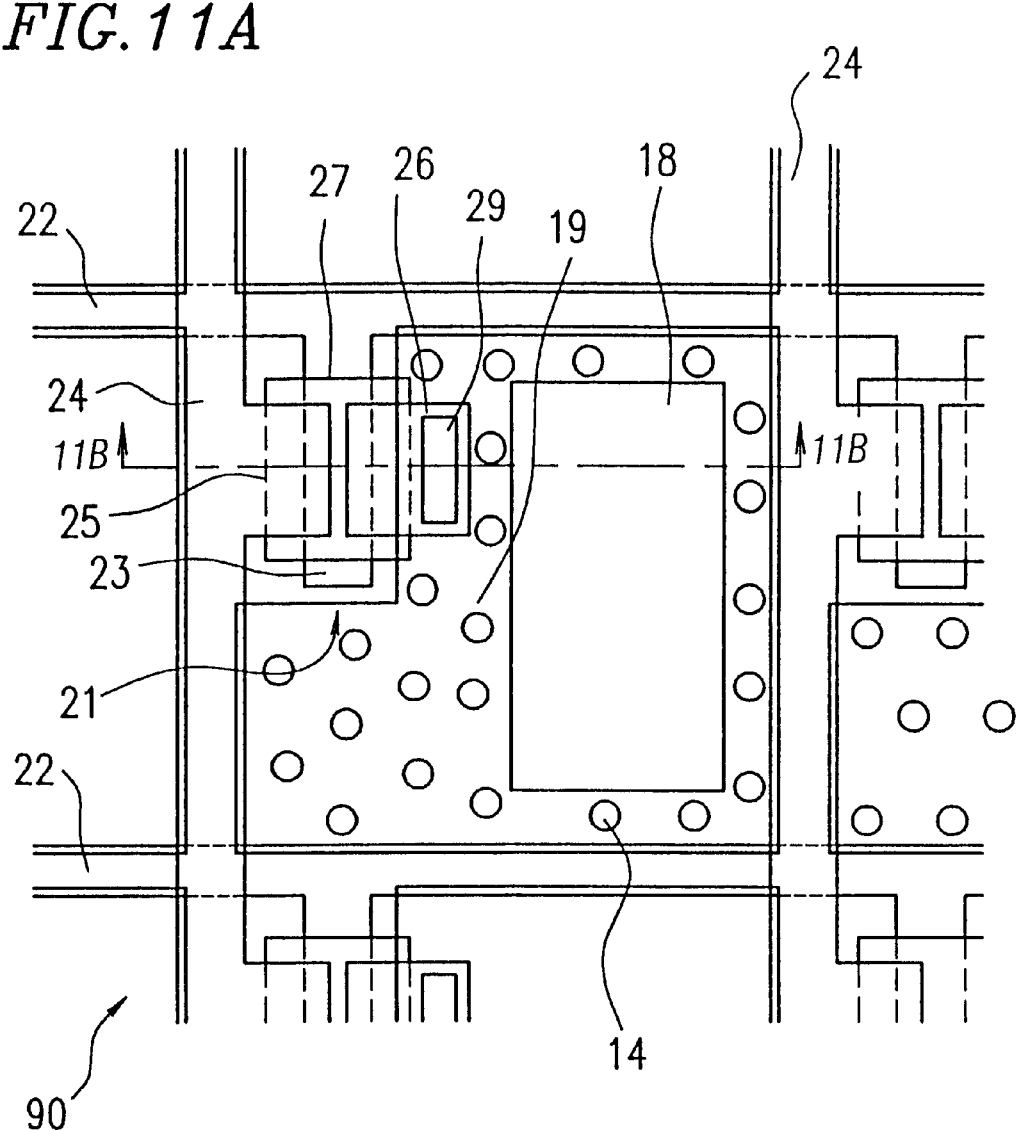
FIG. 11A is a top view schematically illustrating a portion of a transmission/reflection type LCD device according to Example 2 of the present invention.
Figure 11B:
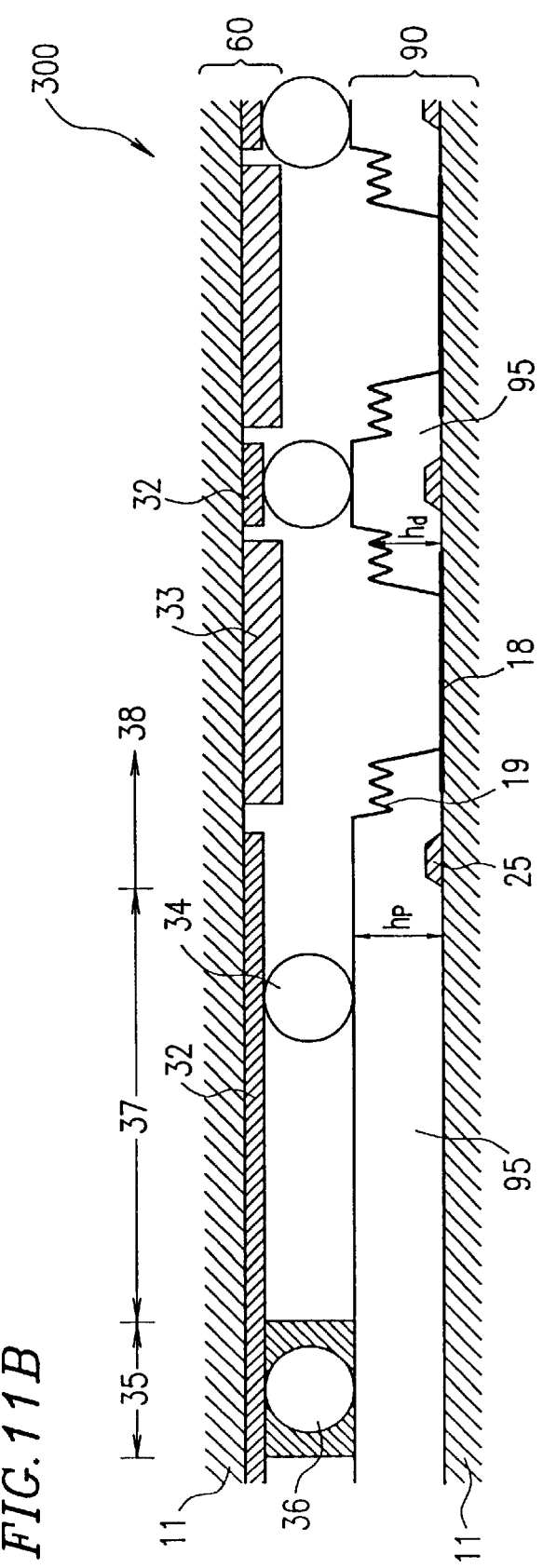
FIG. 11B is a cross-sectional view schematically illustrating a portion of the transmission/reflection type LCD device of Example 2.

A transmission/reflection type LCD device 300 according to Example 2 of the present invention will be described with reference to FIGS. 11A and 11B. FIG. 11A is a top view of a pixel region of an active matrix substrate 90 of the LCD device 300, and FIG. 11B is a cross-sectional view taken along the line 11B—11B of FIG. 11A illustrating a portion of the LCD device 300. The TFT 21 is not shown in FIG. 11B for the sake of simplicity.

Example 2 is different from Example 1 in that no convex portion (FIG. 6D) is provided in a portion of the display region 38 over the TFTs 21, the source bus lines 24 and the gate bus lines 22. A portion of an interlayer insulating layer 95 over the TFTs 21, the source bus lines 24 and the gate bus lines 22 has a flat surface without concave/convex portions, while another portion of the interlayer insulating layer 95 in the non-display region 37 also has a flat surface. Thus, only a portion of the interlayer insulating layer 95 provided in the reflection region has a surface which exhibits a concave/convex profile.

Figure 12:
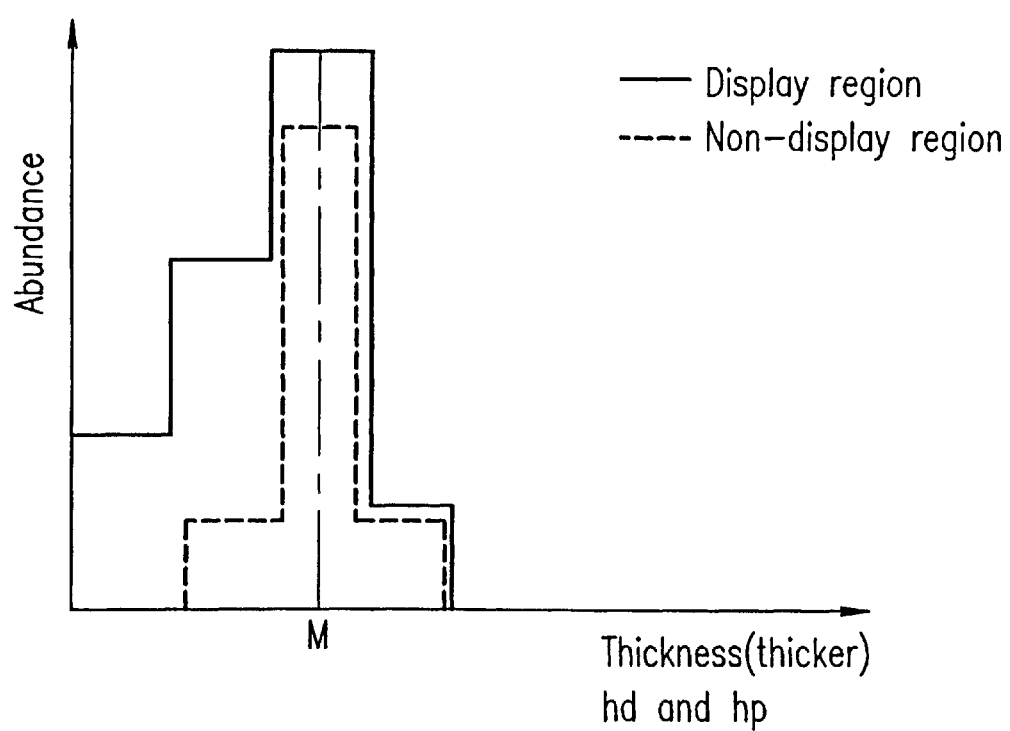
FIG. 12 is a histogram illustrating a thickness distribution of an interlayer insulating layer of the transmission/reflection type LCD device of Example 2.

FIG. 12 illustrates results of a measurement similar to that of Example 1 for the thickness of the interlayer insulating layer 95 of the active matrix substrate 90. As can be seen from the histogram of FIG. 12, while the surface concave/convex profile is different between the display region 38 and the non-display region 37, the region (M) having the greatest distribution is a flat portion in both regions. In FIG. 11A, portions other than a reflection region (e.g., a region over a bus line) are flat portions having a constant thickness which account for a substantial part of the total panel area (i.e., the thickness of the highest distribution). As illustrated in FIG. 11B, the flat portions in the display region are thicker than the concave/convex portions because they are unexposed portions.

In this way, a uniform cell gap without substantial variation can be obtained. Thus, the cell gap in the display region 38 is controlled by the spacers 34 provided on the flat portions of the interlayer insulating layer 95 in the pixel region (e.g., those provided over the TFTs 21, the source bus lines 24 and the gate bus lines 22), while the cell gap in the non-display region 37 is also controlled by the spacers which are provided on the flat surface of the interlayer insulating layer 95.

In the present embodiment, the thickness of the interlayer insulating layer with respect to the substrate surface (glass surface) is about 4 μm, the average thickness of the concave/convex portions with respect to the substrate surface is about 2 μm, the diameter of the cell spacer is about 5.2 μm, and the diameter of the seal spacer is about 5.2 μm.

In the example illustrated in FIG. 11B, the thickness of a portion of the interlayer insulating layer 95 whose surface exhibits a concave/convex profile is reduced from that of a portion of the interlayer insulating layer 95 having a flat surface due to an exposure process. However, by appropriately adjusting the production conditions, the thickness of the flat portion with respect to the substrate surface can be substantially equal to that of the concave/convex portions with respect to the substrate surface, or to the height of the reflection electrode surface thereon with respect to the substrate surface, as illustrated in FIG. 1B. When exposing the (positive type) resist layer 12 (see FIGS. 6A and 6B) to be an underlying layer for the interlayer insulating layer 95 whose surface exhibits a concave/convex profile, a portion of the underlying layer under the flat portion, which is not exposed in the prior art, may also be adequately exposed to reduce the thickness of the portion of the underlying layer so that the height of the flat portion of the interlayer insulating layer 95 to be formed thereon with respect to the substrate surface is substantially equal to that of the concave/convex portion with respect to the substrate surface, or to the height of the reflection electrode surface thereon with respect to the substrate surface. Also, when a negative type resist is used, the amount of exposure may be appropriately controlled to adjust the thickness of the underlying layer so that the height of the flat portion of the interlayer insulating layer 95 with respect to the substrate surface is substantially equal to that of the concave/convex portion with respect to the substrate surface, or to that of the reflection electrode surface thereon with respect to the substrate surface. By adjusting the thickness as described above, the distribution of the thicknesses of the surface supporting the spacers with respect to the substrate surface in the display region 38 can be even closer to that in the non-display region 37, thereby obtaining an even more uniform cell gap.

In this example, while the thickness of the interlayer insulating layer 95 is substantially the same in the flat portion in the display region 38 and in the flat portion in the non-display region 37, a margin of about ±0.5 μm, for example, may be allowed for the thickness.

EXAMPLE 3

Figure 13:
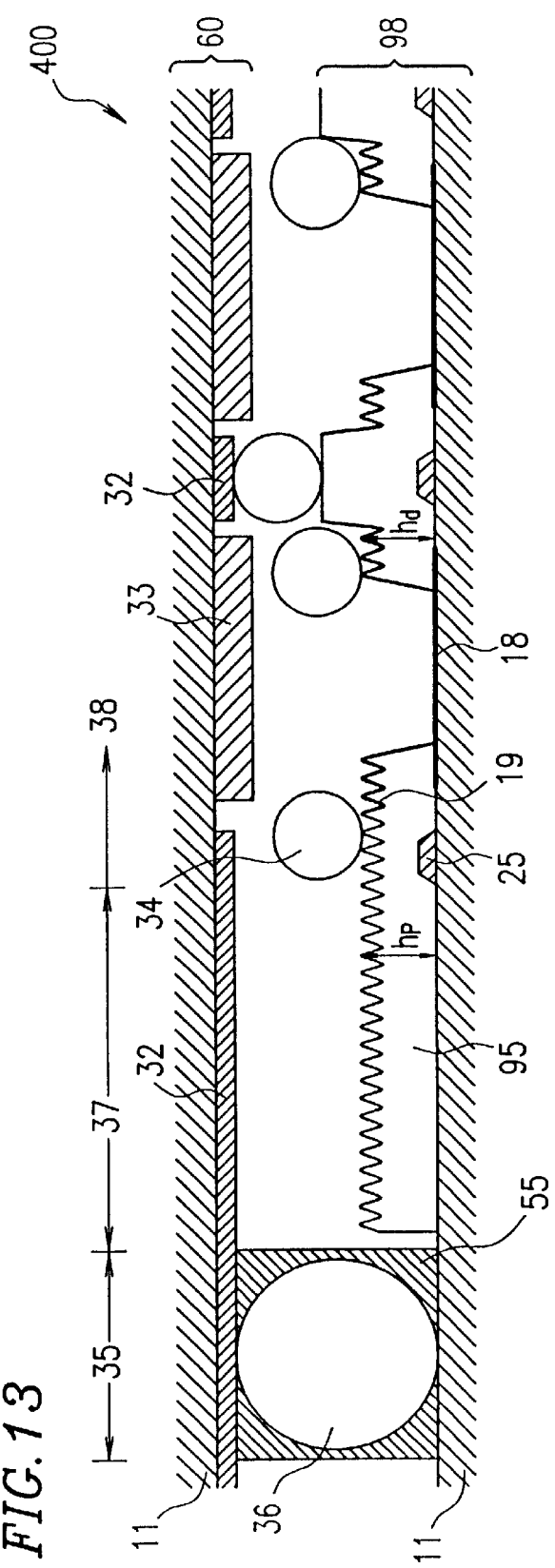
FIG. 13 is a cross-sectional view schematically illustrating a portion of a transmission/reflection type LCD device according to Example 3 of the present invention.

A transmission/reflection type LCD device 400 according to Example 3 of the present invention will be described with reference to FIG. 13. FIG. 13 is a cross-sectional view illustrating a portion of the LCD device 400. The LCD device 400 of Example 3 is different from those of Examples 1 and 2 in that no interlayer insulating layer 95 is provided in the seal region 35 of the active matrix substrate 98 which is defined by a seal section 55. Where the LC panel of the LCD device 400 is produced by using a multiple panel method as illustrated in FIG. 10, no interlayer insulating layer 95 is provided in the dummy seal region 40 as in the seal region 35.

Regarding the structure of the interlayer insulating layer 95 other than the seal region 35, concave/convex portions may be provided across the entire surface thereof as in Example 1 or a flat surface may alternatively be provided in a portion of the display region 38 and in the non-display region 37. Moreover, a flat portion may be provided in a portion of the display region 38 while providing a concave/convex profile to the surface of the other regions including the non-display region 37, as illustrated in FIG. 13.

Figure 14:
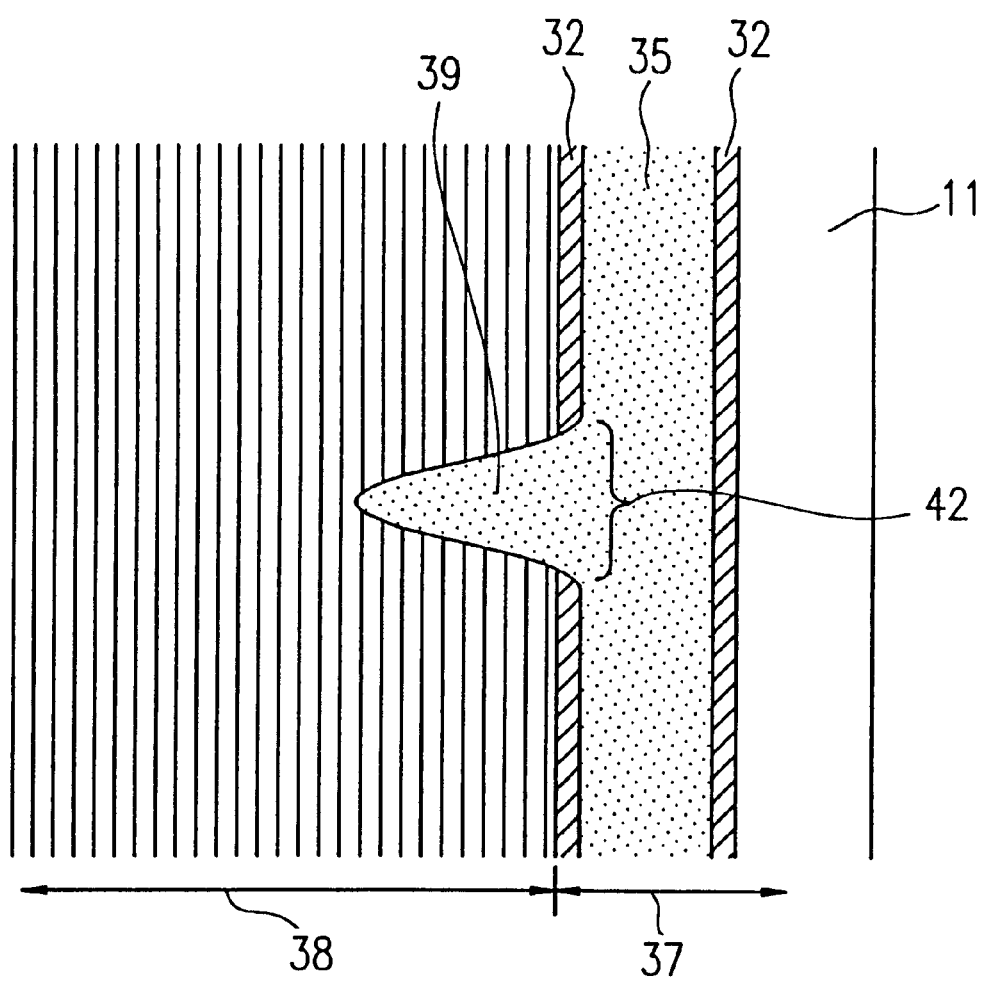
FIG. 14 is a plan view illustrating a possible defective display which may be caused by separation of the components of a sealant.

In the present example, the thickness of the flat portion of the interlayer insulating layer with respect to the substrate surface is about 2 μm, the average thickness of the concave/convex portions with respect to the substrate surface is about 1.5 μm, the diameter of the cell spacers is about 3 μm and the diameter of the seal spacer is about 7.0 μm.

Where no interlayer insulating layer 95 is provided in the seal region 35, the size of the seal spacer 36 is preferably larger than those used in Examples 1 and 2 by the thickness of the interlayer insulating layer. Thus, it is possible to reduce the change in the thickness of the sealant due to the pressure applied in a heat press process for a pair of substrates attached together with the sealant having been applied or printed thereon. As a result, it is possible to avoid the possible deterioration of a low-viscosity epoxy resin (a component of the sealant) being separated from the filler portion, or the possible defective display which may be caused by the separated epoxy resin 39, or the like, being drawn into the display region 38 through an injection port 42 as illustrated in FIG. 14. Moreover, the adhesion between the sealant and the respective substrates 60 and 98 is improved. Furthermore, the time required for the injection of the LC material can be significantly reduced because the height of the injection port may be increased. A comparison with Example 2 for a 3.5-inch panel showed a reduction in the injection time from about 40 minutes to about 20 minutes.

While the examples described above are those relating to a transmission/reflection type LCD device, the present invention can similarly be used with a reflection type LCD device except that no transparent electrode 18 is provided in the pixel region, and substantially the same effects as described above can still be realized.

As described above, according to the present invention, the cell gap in the display region can be substantially equal to that in the non-display region, thereby providing an LCD device with no defective display due to the variation in cell gap. The present invention can particularly provide a transmission/reflection type LCD device with a desirable display quality.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A liquid crystal display device, comprising:
 a first substrate;
 a second substrate;
 a liquid crystal layer interposed between the first substrate and the second substrate;
 a display region including a plurality of pixel regions each defined by a pair of electrodes for applying a voltage across the liquid crystal layer; and
 a non-display region surrounding the display region, wherein:
  the first substrate includes a reflection electrode region provided in the display region for each of the pixel electrodes;
  the reflection electrode region includes a first insulating layer having a surface which exhibits a concave/convex profile and a reflection layer formed on the first insulating layer;
  the first substrate includes a second insulating layer in the non-display region; and $H_{min}-0.5 \leq h_{mode} \leq H_{max}+0.5$ (unit: $\mu$m)

where: $h_{mode}$ denotes a mode among heights of the insulating layer surface in the non-display region with respect to a reference surface; and $H_{max}$ and $H_{min}$ respectively denote maximum and minimum heights of a surface of the reflection layer in the display region which exhibits the concave/convex profile with respect to the reference surface.

2. A liquid crystal display device according to claim 1, wherein $H_{min}-0.5 \leq h \leq H_{max}+0.5$ (unit: $\mu$m)

where h denotes a height of a surface of the second insulating layer in the non-display region with respect to the reference surface.

3. A liquid crystal display device according to claim 1, wherein the second insulating layer in the non-display region includes a surface which exhibits a concave/convex profile, the concave/convex profile being substantially the same as that of the first insulating layer in the display region.

4. A liquid crystal display device according to claim 1, wherein the second insulating layer in the non-display region includes a surface which exhibits a concave/convex profile, the concave/convex profile being different from that of the first insulating layer in the display region.

5. A liquid crystal display device, comprising:
 a first substrate;
 a second substrate;
 a liquid crystal layer interposed between the first substrate and the second substrate;
 a display region including a plurality of pixel regions each defined by a pair of electrodes for applying a voltage across the liquid crystal layer; and
 a non-display region surrounding the display region, wherein:
  the first substrate includes a reflection electrode region provided in the display region for each of the pixel electrodes;
  the reflection electrode region includes a first insulating layer having a surface which exhibits a concave/convex profile and a reflection layer formed on the first insulating layer;
  the first substrate includes a second insulating layer in the non-display region; and
  an interval between the first substrate and the second substrate is controlled to be uniform by spacers of substantially the same diameter which are provided on a portion of the first insulating layer in the display region which is not covered with the reflection layer and on the second insulating layer in the non-display region.

6. A liquid crystal display device, according to claim 5, wherein a distribution of heights of the first insulating layer with respect to a reference surface in the display region is substantially the same as that in the non-display region.

7. A liquid crystal display device, according to claim 1, wherein:
 the pair of electrodes comprises a pixel electrode and a counter electrode;
 the first substrate includes:
  a plurality of gate lines;
  a plurality of source lines perpendicularly crossing the gate lines;
  a plurality of switching elements each of which is provided in a vicinity of an intersection of one of the gate lines and one of the source lines; and
  a plurality of the pixel electrodes connected to the switching elements, respectively;
 the second substrate includes a plurality of the counter electrodes;
 each of the pixel regions is defined by one of the pixel electrodes, one of the counter electrodes, a portion of the liquid crystal layer interposed between the one of the pixel electrodes and the one of the counter electrodes; and
 the first substrate further includes a transmission electrode region which is provided for each of the pixel regions.

8. A liquid crystal display device, according to claim 5, wherein:
 the pair of electrodes comprises a pixel electrode and a counter electrode;
 the first substrate includes:
  a plurality of gate lines;
  a plurality of source lines perpendicularly crossing the gate lines;
  a plurality of switching elements each of which is provided in a vicinity of an intersection of one of the gate lines and one of the source lines; and a plurality of the pixel electrodes connected to the switching elements, respectively;

the second substrate includes a plurality of the counter electrodes;

each of the pixel regions is defined by one of the pixel electrodes, one of the counter electrodes, a portion of the liquid crystal layer interposed between the one of the pixel electrodes and the one of the counter electrodes; and the first substrate further includes a transmission electrode region which is provided for each of the pixel regions.

9. A liquid crystal display device, according to claim 1, wherein:

the first substrate further includes a transmission region which is provided for each of the pixel regions; and a thickness of the liquid crystal layer in the reflection electrode region is about ½ of that in the transmission electrode region.

10. A liquid crystal display device, according to claim 5, wherein:

the first substrate further includes a transmission region which is provided for each of the pixel regions; and a thickness of the liquid crystal layer in the reflection electrode region is about ½ of that in the transmission electrode region.

11. A liquid crystal display device, according to claim 1, wherein:

a seal section is provided in the non-display region for attaching the first substrate to the second substrate and for sealing the liquid crystal layer within a gap between the first substrate and the second substrate; and no insulating layer is provided in a region of the first substrate in the non-display region corresponding to the seal section.

12. A liquid crystal display device, according to claim 5, wherein:

a seal section is provided in the non-display region for attaching the first substrate to the second substrate and for sealing the liquid crystal layer within a gap between the first substrate and the second substrate; and no insulating layer is provided in a region of the first substrate in the non-display region corresponding to the seal section.

* * * * *